US012627456B2

(12) United States Patent
Xu et al.

(10) Patent No.: US 12,627,456 B2
(45) Date of Patent: May 12, 2026

(54) TECHNIQUES FOR BANDWIDTH PART SWITCHING PATTERNS

(71) Applicant: QUALCOMM INCORPORATED, San Diego, CA (US)

(72) Inventors: Huilin Xu, Temecula, CA (US); Peng Cheng, Beijing (CN); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 18/249,368

(22) PCT Filed: Jan. 1, 2021

(86) PCT No.: PCT/CN2021/070051
§ 371 (c)(1),
(2) Date: Apr. 17, 2023

(87) PCT Pub. No.: WO2022/141613
PCT Pub. Date: Jul. 7, 2022

(65) Prior Publication Data
US 2023/0396403 A1 Dec. 7, 2023

(51) Int. Cl.
*H04L 5/00* (2006.01)
*H04W 72/0453* (2023.01)

(52) U.S. Cl.
CPC ............ *H04L 5/0096* (2013.01); *H04L 5/001* (2013.01); *H04L 5/0064* (2013.01); *H04L 5/0091* (2013.01); *H04W 72/0453* (2013.01)

(58) Field of Classification Search
CPC ..... H04L 5/001; H04L 5/0064; H04L 5/0091; H04L 5/0096; H04W 72/0453
See application file for complete search history.

(56) References Cited

U.S. PATENT DOCUMENTS

2018/0191474 A1* 7/2018 Sun ........................ H04W 72/23
2019/0261406 A1* 8/2019 Kim .................... H04L 27/2666
(Continued)

FOREIGN PATENT DOCUMENTS

CN 109561489 A 4/2019
CN 111278117 A 6/2020
(Continued)

OTHER PUBLICATIONS

Mediatek Inc: "Motivation to Introduce New R17 WI on Further RRN Enhancement (RAN4)", 3GPP TSG RAN Meeting #87e, RP-200162, 3rd Generation Partnership Project, Mobile Competence Centre, 650, Route Des Lucioles, F-06921, Sophia-Antipolis Cedex, France, vol. TSG RAN, No. Electronic Meeting, Mar. 16, 2020-Mar. 19, 2020, Mar. 11, 2020, 7 Pages, XP052334057, pp. 3-4, 2.3 Fast DCI-based BWP switch.
(Continued)

*Primary Examiner* — Hadi S Armouche
(74) *Attorney, Agent, or Firm* — Holland & Hart LLP/QUALCOMM Incorporated

(57) ABSTRACT

Methods, systems, and devices for wireless communications are described. A first device of a wireless communications network may receive, from a second device of the wireless communications network, a configuration for a bandwidth part switching pattern for wireless communications performed at the first device, the bandwidth part switching pattern including at least a first bandwidth part and a second bandwidth part different from the first bandwidth part. The first device may transmit a first transmission to one or more devices of the wireless communications network during a first time interval and in accordance with the first bandwidth part, and may transmit a second transmission to the one or more devices of the wireless communications network dur-
(Continued)

ing a second time interval different from the first time interval and in accordance with the second bandwidth part.

36 Claims, 15 Drawing Sheets

(56)                References Cited

U.S. PATENT DOCUMENTS

| | | | | |
|---|---|---|---|---|
| 2019/0289513 | A1 | 9/2019 | Jeon et al. | |
| 2020/0382157 | A1 | 12/2020 | Bhamri et al. | |
| 2021/0014829 | A1* | 1/2021 | Kalhan | H04W 48/12 |
| 2021/0120581 | A1* | 4/2021 | Kim | H04W 74/002 |
| 2023/0223985 | A1* | 7/2023 | Rastegardoost | H04W 72/23 |
| | | | | 375/132 |
| 2023/0247614 | A1* | 8/2023 | Li | H04L 5/0012 |
| | | | | 370/329 |
| 2024/0049151 | A1* | 2/2024 | Oh | H04L 1/1854 |

FOREIGN PATENT DOCUMENTS

| | | | |
|---|---|---|---|
| CN | 111436082 | A | 7/2020 |
| WO | WO-2019193402 | A1 | 10/2019 |
| WO | 2020130593 | A1 | 6/2020 |
| WO | WO-2020252719 | A1 | 12/2020 |

OTHER PUBLICATIONS

Qualcomm Incorporated: "Motivations for Measurement Gap Enhancements WI in NR R17", 3GPP TSG RAN Meeting #89e, RP-201687, 3rd Generation Partnership Project, Mobile Competence Centre, 650, Route Des Lucioles, F-06921, Sophia-Antipolis Cedex, FRANCE, vol. TSG RAN, No. Electronic Meeting, Sep. 14, 2020-Sep. 18, 2020, Sep. 10, 2020, 5 Pages, XP05234052 1, pp. 2-3, 2.4 Pre-configured MG per active BWP.

Supplementary European Search Report—EP21912396—Search Authority—The Hague—Jul. 17, 2024.

International Search Report and Written Opinion—PCT/CN2021/070051—ISA/EPO—Sep. 28, 2021.

Mediatek Inc: "CR on Active BWP Switch in R16," 3GPP TSG-RAN WG4 Meeting # 96-e, R4-2010033, Electronic Meeting, Aug. 17-28, 2020, (Aug. 28, 2020), 5 pages, the whole document.

LG Electronics: "Discussion on Physical Layer Structure for NR Sidelink", 3GPP TSG RAN WG1 #98, R1-1908900, Prague, CZ, Aug. 26-30, 2019, Aug. 17, 2019, 34 pages.

* cited by examiner 410 420 415

405

400

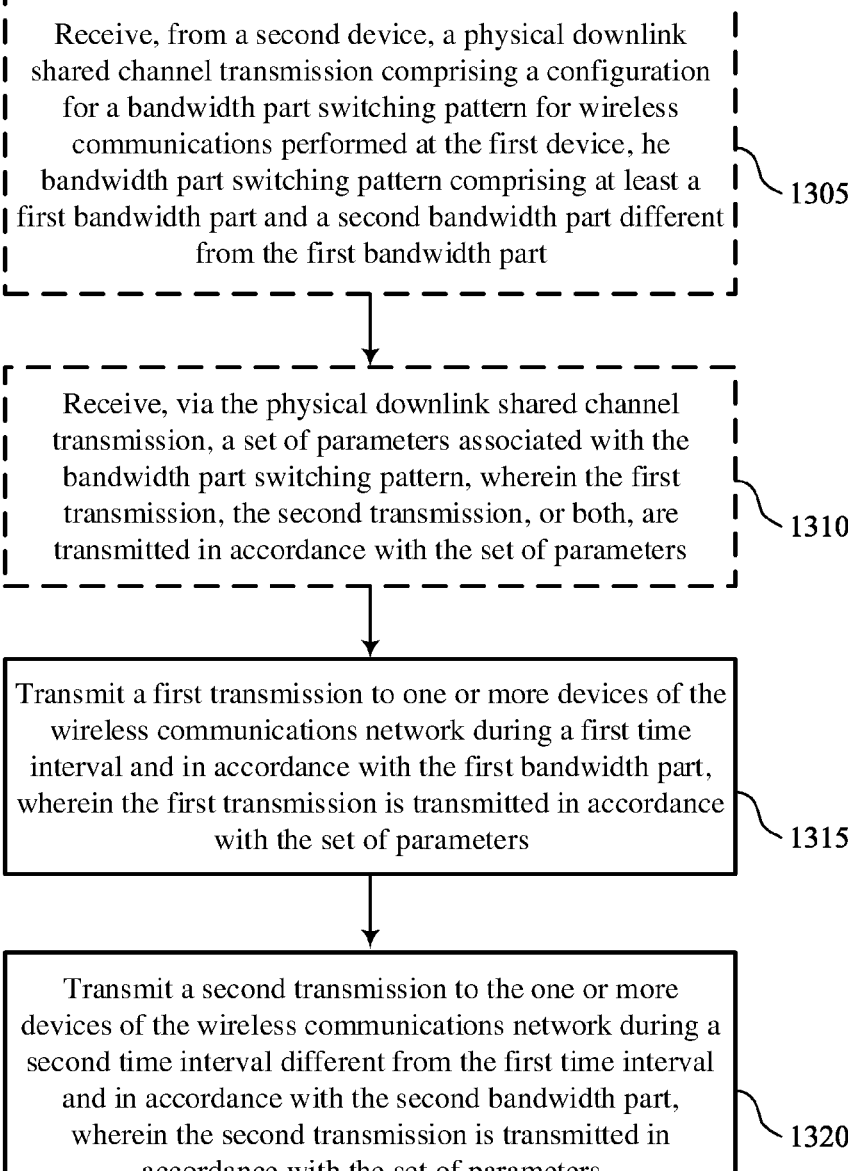

Receive, from a second device, a physical downlink shared channel transmission comprising a configuration for a bandwidth part switching pattern for wireless communications performed at the first device, he bandwidth part switching pattern comprising at least a first bandwidth part and a second bandwidth part different from the first bandwidth part

1305

Receive, via the physical downlink shared channel transmission, a set of parameters associated with the bandwidth part switching pattern, wherein the first transmission, the second transmission, or both, are transmitted in accordance with the set of parameters

1310

Transmit a first transmission to one or more devices of the wireless communications network during a first time interval and in accordance with the first bandwidth part, wherein the first transmission is transmitted in accordance with the set of parameters

1315

Transmit a second transmission to the one or more devices of the wireless communications network during a second time interval different from the first time interval and in accordance with the second bandwidth part, wherein the second transmission is transmitted in accordance with the set of parameters

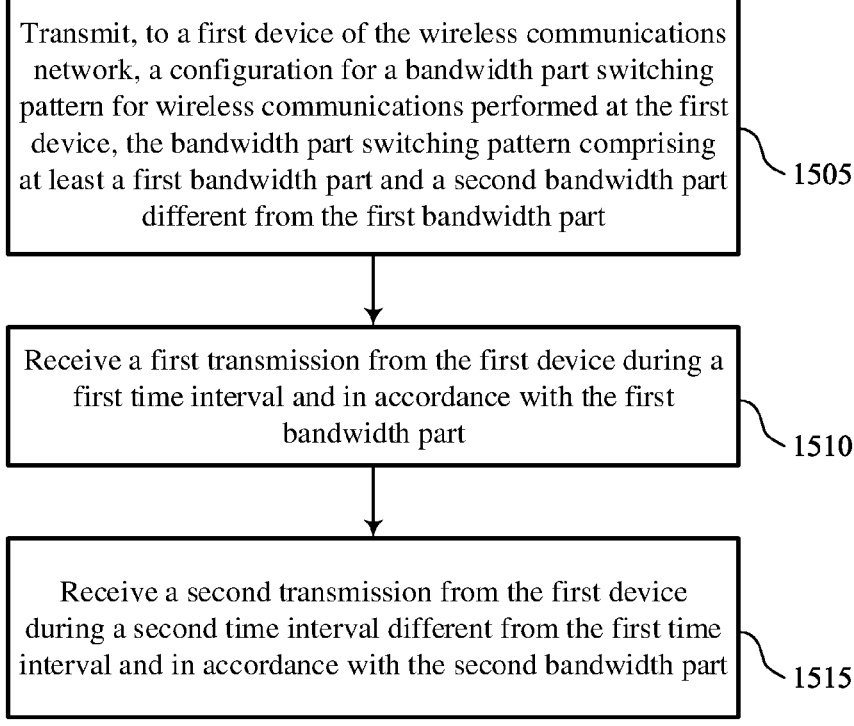

Transmit, to a first device of the wireless communications network, a configuration for a bandwidth part switching pattern for wireless communications performed at the first device, the bandwidth part switching pattern comprising at least a first bandwidth part and a second bandwidth part different from the first bandwidth part

1505

Receive a first transmission from the first device during a first time interval and in accordance with the first bandwidth part

1510

Receive a second transmission from the first device during a second time interval different from the first time interval and in accordance with the second bandwidth part

TECHNIQUES FOR BANDWIDTH PART SWITCHING PATTERNS

CROSS REFERENCE

The present Application is a 371 national stage filing of International PCT Application No. PCT/CN2021/070051 by XU et al. entitled "TECHNIQUES FOR BANDWIDTH PART SWITCHING PATTERNS," filed Jan. 1, 2021, which is assigned to the assignee hereof, and which is expressly incorporated by reference in its entirety herein.

INTRODUCTION

The following relates to wireless communications, and, more specifically, techniques for signaling bandwidth parts (BWPs) for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device of a wireless communications network is described. The method may include receiving, from a second device of the wireless communications network, a configuration for a BWP switching pattern for wireless communications performed at the first device, the BWP switching pattern including at least a first BWP and a second BWP different from the first BWP, transmitting a first transmission to one or more devices of the wireless communications network during a first time interval and in accordance with the first BWP, and transmitting a second transmission to the one or more devices of the wireless communications network during a second time interval different from the first time interval and in accordance with the second BWP.

An apparatus for wireless communication at a first device of a wireless communications network is described. The apparatus may include a processor, memory in electronic communication with the processor, and instructions stored in the memory. The instructions may be executable by the processor to cause the apparatus to receive, from a second device of the wireless communications network, a configuration for a BWP switching pattern for wireless communications performed at the first device, the BWP switching pattern including at least a first BWP and a second BWP different from the first BWP, transmit a first transmission to one or more devices of the wireless communications network during a first time interval and in accordance with the first BWP, and transmit a second transmission to the one or more devices of the wireless communications network during a second time interval different from the first time interval and in accordance with the second BWP.

Another apparatus for wireless communication at a first device of a wireless communications network is described. The apparatus may include means for receiving, from a second device of the wireless communications network, a configuration for a BWP switching pattern for wireless communications performed at the first device, the BWP switching pattern including at least a first BWP and a second BWP different from the first BWP, means for transmitting a first transmission to one or more devices of the wireless communications network during a first time interval and in accordance with the first BWP, and means for transmitting a second transmission to the one or more devices of the wireless communications network during a second time interval different from the first time interval and in accordance with the second BWP.

A non-transitory computer-readable medium storing code for wireless communication at a first device of a wireless communications network is described. The code may include instructions executable by a processor to receive, from a second device of the wireless communications network, a configuration for a BWP switching pattern for wireless communications performed at the first device, the BWP switching pattern including at least a first BWP and a second BWP different from the first BWP, transmit a first transmission to one or more devices of the wireless communications network during a first time interval and in accordance with the first BWP, and transmit a second transmission to the one or more devices of the wireless communications network during a second time interval different from the first time interval and in accordance with the second BWP.

Some examples of the method, apparatuses, and non-transitory computer-readable medium described herein may further include operations, features, means, or instructions for receiving, from the second device, a physical downlink shared channel (PDSCH) transmission including the configuration for the BWP switching pattern, where transmitting the first transmission, the second transmission, or both, may be based on receiving the PDSCH transmission.

Some examples of the method, apparatuses, and non-transitory computer-readable medium described herein may further include operations, features, means, or instructions for receiving, via the PDSCH transmission, a set of parameters associated with the BWP switching pattern, where the first transmission, the second transmission, or both, may be transmitted in accordance with the set of parameters.

Some examples of the method, apparatuses, and non-transitory computer-readable medium described herein may further include operations, features, means, or instructions for receiving, from the second device, a downlink control information (DCI) message including an indication of at least one parameter which may be different from the set of parameters, where the first transmission, the second transmission, or both, may be transmitted in accordance with the at least one parameter.

Some examples of the method, apparatuses, and non-transitory computer-readable medium described herein may further include operations, features, means, or instructions for receiving, from the second device, a DCI message including an indication for the first device to perform wireless communications according to the BWP switching pattern, where transmitting the first transmission, the second transmission, or both, may be based on receiving the DCI message.

Some examples of the method, apparatuses, and non-transitory computer-readable medium described herein may further include operations, features, means, or instructions for receiving, from the second device, a DCI message including an indication for the first device to refrain from performing subsequent transmissions according to the BWP switching pattern.

In some examples of the method, apparatuses, and non-transitory computer-readable medium described herein, the PDSCH transmission includes a radio resource control (RRC) message, a media access control (MAC) control element (MAC-CE) message, or both.

Some examples of the method, apparatuses, and non-transitory computer-readable medium described herein may further include operations, features, means, or instructions for transmitting, to the second device, a request for the BWP switching pattern, where the PDSCH transmission may be received in response to the request.

Some examples of the method, apparatuses, and non-transitory computer-readable medium described herein may further include operations, features, means, or instructions for transmitting, to the second device via the request, an indication of a first set of parameters associated with BWP switching at the first device, an indication of a second set of parameters associated with the wireless communications network, or both, where the BWP switching pattern may be based on the first set of parameters, the second set of parameters, or both.

Some examples of the method, apparatuses, and non-transitory computer-readable medium described herein may further include operations, features, means, or instructions for receiving, from the second device, a RRC message including an indication of a set of BWP switching patterns, where the BWP switching pattern indicated in the request may be included within the set of BWP switching patterns.

In some examples of the method, apparatuses, and non-transitory computer-readable medium described herein, and the method, apparatuses, and non-transitory computer-readable medium may include further operations, features, means, or instructions for transmitting an indication of the BWP switching pattern to the third device, where transmitting the first transmission, the second transmission, or both, may be based on transmitting the indication of the BWP switching pattern.

In some examples of the method, apparatuses, and non-transitory computer-readable medium described herein, and the method, apparatuses, and non-transitory computer-readable medium may include further operations, features, means, or instructions for transmitting, to the third device, an indication of the first BWP of the BWP switching pattern, transmitting the first transmission to the third device in accordance with the BWP switching pattern and based on transmitting the indication of the BWP switching pattern, transmitting, to the third device, an indication of a BWP switching procedure from the first BWP to the second BWP, and transmitting the second transmission to the third device based on transmitting the indication of the BWP switching procedure.

Some examples of the method, apparatuses, and non-transitory computer-readable medium described herein may further include operations, features, means, or instructions for activating the first BWP based at least in a part on the BWP switching pattern, where transmitting the first transmission may be based on the activating and performing a BWP switching procedure from the first BWP to the second BWP to activate the second BWP, where transmitting the second transmission may be based on performing the BWP switching procedure.

In some examples of the method, apparatuses, and non-transitory computer-readable medium described herein, the BWP switching pattern includes a set of multiple BWPs for wireless communications performed during a set of multiple time intervals, where each time interval of the set of multiple time intervals may be associated with a BWP of the set of multiple BWPs.

In some examples of the method, apparatuses, and non-transitory computer-readable medium described herein, the first device includes a first UE, and the one or more devices of the wireless communications network include at least one of a base station and a second UE.

In some examples of the method, apparatuses, and non-transitory computer-readable medium described herein, the first device includes a first UE and the one or more devices of the wireless communications network include a second UE, the BWP switching pattern may be associated with sidelink communications between the first UE and the second UE, the first transmission includes a first sidelink transmission from the first UE to the second UE, and the second transmission includes a second sidelink transmission from the first UE to the second UE.

A method for wireless communication at a second device of a wireless communications network is described. The method may include transmitting, to a first device of the wireless communications network, a configuration for a BWP switching pattern for wireless communications performed at the first device, the BWP switching pattern including at least a first BWP and a second BWP different from the first BWP, receiving a first transmission from the first device during a first time interval and in accordance with the first BWP, and receiving a second transmission from the first device during a second time interval different from the first time interval and in accordance with the second BWP.

An apparatus for wireless communication at a second device of a wireless communications network is described. The apparatus may include a processor, memory in electronic communication with the processor, and instructions stored in the memory. The instructions may be executable by the processor to cause the apparatus to transmit, to a first device of the wireless communications network, a configuration for a BWP switching pattern for wireless communications performed at the first device, the BWP switching pattern including at least a first BWP and a second BWP different from the first BWP, receive a first transmission from the first device during a first time interval and in accordance with the first BWP, and receive a second transmission from the first device during a second time interval different from the first time interval and in accordance with the second BWP.

Another apparatus for wireless communication at a second device of a wireless communications network is described. The apparatus may include means for transmitting, to a first device of the wireless communications network, a configuration for a BWP switching pattern for wireless communications performed at the first device, the BWP switching pattern including at least a first BWP and a second BWP different from the first BWP, means for receiving a first transmission from the first device during a first time interval and in accordance with the first BWP, and means for receiving a second transmission from the first device during a second time interval different from the first time interval and in accordance with the second BWP.

A non-transitory computer-readable medium storing code for wireless communication at a second device of a wireless communications network is described. The code may include instructions executable by a processor to transmit, to a first device of the wireless communications network, a configuration for a BWP switching pattern for wireless communications performed at the first device, the BWP switching pattern including at least a first BWP and a second BWP different from the first BWP, receive a first transmission from the first device during a first time interval and in accordance with the first BWP, and receive a second transmission from the first device during a second time interval different from the first time interval and in accordance with the second BWP.

Some examples of the method, apparatuses, and non-transitory computer-readable medium described herein may further include operations, features, means, or instructions for transmitting, to the first device, a PDSCH transmission including the configuration for the BWP switching pattern, where receiving the first transmission, the second transmission, or both, may be based on transmitting the PDSCH transmission.

Some examples of the method, apparatuses, and non-transitory computer-readable medium described herein may further include operations, features, means, or instructions for transmitting, via the PDSCH transmission, a set of parameters associated with the BWP switching pattern, where the first transmission, the second transmission, or both, may be received in accordance with the set of parameters.

Some examples of the method, apparatuses, and non-transitory computer-readable medium described herein may further include operations, features, means, or instructions for transmitting, to the first device, a DCI message including an indication of at least one parameter which may be different from the set of parameters, where the first transmission, the second transmission, or both, may be received in accordance with the at least one parameter.

Some examples of the method, apparatuses, and non-transitory computer-readable medium described herein may further include operations, features, means, or instructions for transmitting, to the first device, a DCI message including an indication for the first device to perform wireless communications according to the BWP switching pattern, where receiving the first transmission, the second transmission, or both, may be based on transmitting the DCI message.

Some examples of the method, apparatuses, and non-transitory computer-readable medium described herein may further include operations, features, means, or instructions for transmitting, to the first device, a DCI message including an indication for the first device to refrain from performing subsequent transmissions according to the BWP switching pattern.

In some examples of the method, apparatuses, and non-transitory computer-readable medium described herein, the PDSCH transmission includes a RRC message, a MAC-CE message, or both.

Some examples of the method, apparatuses, and non-transitory computer-readable medium described herein may further include operations, features, means, or instructions for receiving, from the first device, a request for the BWP switching pattern, where the PDSCH transmission may be transmitted in response to the request.

Some examples of the method, apparatuses, and non-transitory computer-readable medium described herein may further include operations, features, means, or instructions for receiving, from the first device via the request, an indication of a first set of parameters associated with BWP switching at the first device, an indication of a second set of parameters associated with the wireless communications network, or both, where the BWP switching pattern may be based on the first set of parameters, the second set of parameters, or both.

Some examples of the method, apparatuses, and non-transitory computer-readable medium described herein may further include operations, features, means, or instructions for transmitting, to the first device, a RRC message including an indication of a set of BWP switching patterns, where the BWP switching pattern indicated in the request may be included within the set of BWP switching patterns.

In some examples of the method, apparatuses, and non-transitory computer-readable medium described herein, the BWP switching pattern includes a set of multiple BWPs for wireless communications performed during a set of multiple time intervals, where each time interval of the set of multiple time intervals may be associated with a BWP of the set of multiple BWPs.

In some examples of the method, apparatuses, and non-transitory computer-readable medium described herein, the first device includes a first UE and the second device includes a base station.

BRIEF DESCRIPTION OF THE DRAWINGS

FIGS. 12 through 15 show flowcharts illustrating methods that support techniques for BWP switching patterns in accordance with one or more aspects of the present disclosure.

DETAILED DESCRIPTION

Figure 1:
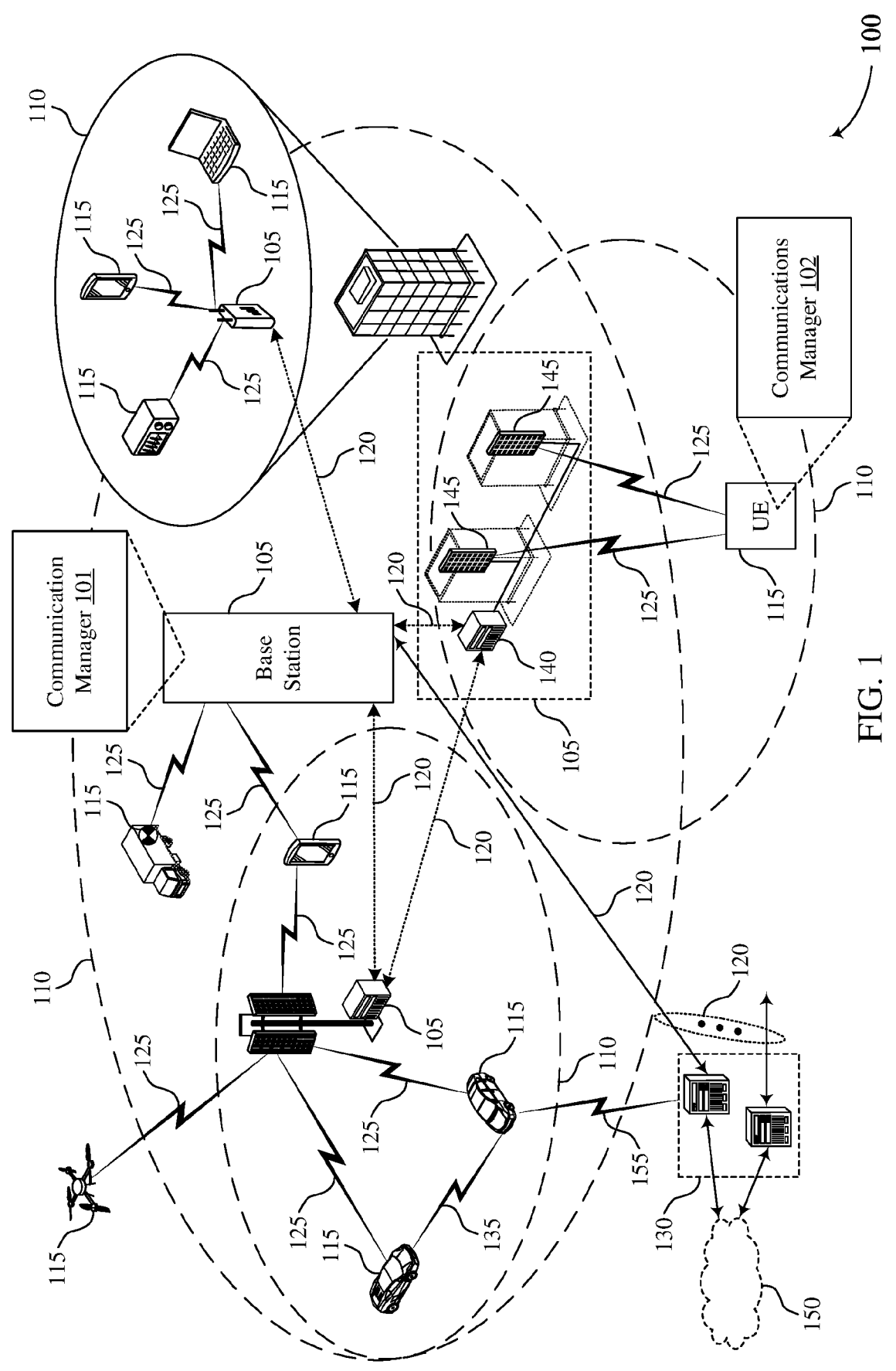
FIG. 1 illustrates an example of a wireless communications system that supports techniques for BWP switching patterns in accordance with one or more aspects of the present disclosure.

Some wireless communications systems support wireless communications within multiple BWPs. For example, in the context of NR wireless communications, a user equipment (UE) may be configured with up to four active bandwidth parts for uplink and downlink transmissions between the UE and a base station. The term "active BWP" may be used to refer to a BWP which is used for wireless communications during a time interval. Thus, by configuring multiple active BWPs for wireless communications, UEs may be able to perform multiple transmissions with the base station within the multiple active BWPs. For example, cases where a UE is configured with multiple active BWPs, the UE may be configured to perform a first transmission and a second transmission, where the first transmission and the second transmission at least partially overlap in the time domain, frequency domain, or both (e.g., concurrent transmissions, simultaneous transmissions). Configuring multiple BWPs may enable improved power performance, and improve resource allocation. However, some wireless communications systems support only a single active BWP for sidelink communications, such as sidelink communications. In this regard, control signaling (e.g., RRC signaling from a base station) may be required each time a UE is to be configured with a different BWP for sidelink communications. This may increase network overhead and traffic within a wireless communications system.

Accordingly, techniques for signaling BWP switching patterns which may be used for sidelink communications, uplink/downlink communications, or both, are disclosed. In some aspects, a UE may receive a BWP switching pattern from a base station, and may perform sidelink communications with an additional UE in accordance with the BWP switching pattern. As it is used herein, a "BWP switching pattern" may include a sequence of BWPs, where each BWP in the sequence is associated with wireless communications throughout a respective time interval (e.g., first BWP for a first time interval, second BWP for a second time interval). In some implementations, a BWP switching pattern may be used to configure sidelink communications between a UE and an additional UE, uplink/downlink communications between a UE and a base station, or both. In some aspects, the BWP switching pattern may be indicated to a UE via RRC signaling, MAC-CE messages, or both.

In some cases, a UE may be configured (e.g., via RRC signaling) with a set of BWP switching patterns which may be used for wireless communications (e.g., sidelink communications) at the UE. In this regard, the UE may be configured with one or more BWP switching patterns, and may subsequently receive DCI messages which activate/deactivate the BWP switching patterns, modify the BWP switching patterns, or both. Moreover, in some cases, a UE may transmit a request for a BWP switching pattern, and may receive the BWP switching pattern in response to the request. Parameters associated with a BWP switching pattern which may be indicated to the UE may include a periodicity for the BWP switching pattern, a start time (e.g., time offset) for the BWP switching pattern, the sequence of BWPs within the BWP switching pattern, time intervals associated with each respective BWP, and the like. Techniques described herein may enable signaling which configures UEs with a BWP switching pattern for wireless communications (e.g., sidelink communications), thereby reducing control signaling overhead and improving resource utilization within a wireless communications system.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for BWP switching patterns.

FIG. 1 illustrates an example of a wireless communications system 100 that supports techniques for BWP switching patterns in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at given orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a given orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for signaling BWP switching patterns which may be used for sidelink communications, uplink/downlink communications, or both. For example, a UE 115 of the wireless communications system 100 may receive a BWP switching pattern from a base station 105, and may perform sidelink communications with an additional UE 115 in accordance with the BWP switching pattern. In some implementations, a BWP switching pattern may include a sequence of BWPs, where each BWP in the sequence is associated with wireless communications throughout a respective time interval (e.g., first BWP for a first time interval, second BWP for a second time interval). In some implementations, a BWP switching pattern may be used to configure sidelink communications between the UE 115 and the additional UE 115, uplink/downlink communications between the UE 115 and the base station 105, or both. In some aspects, the BWP switching pattern may be indicated to the UE 115 via RRC signaling, MAC-CE messages, or both.

In some cases, UEs 115 of the wireless communications system 100 may be configured (e.g., via RRC signaling) with a set of BWP switching patterns which may be used for wireless communications (e.g., sidelink communications) at the respective UEs 115. In this regard, a UE 115 may be configured with one or more BWP switching patterns, and may subsequently receive DCI messages which activate/deactivate the BWP switching patterns, modify the BWP switching patterns, or both. Moreover, in some cases, a UE 115 may transmit a request for a BWP switching pattern, and may receive the BWP switching pattern in response to the request.

In some aspects, a base station 105 may indicate, to a UE 115, one or more parameters associated with a BWP switching pattern configured at the respective UE 115. Parameters associated with a BWP switching pattern which may be indicated to the UE 115 may include a periodicity for the BWP switching pattern, a start time (e.g., time offset) for the BWP switching pattern, the sequence of BWPs within the BWP switching pattern, time intervals associated with each respective BWP, and the like.

Techniques described herein may enable a UE 115 to be configured with one or more BWP switching patterns, which may be used for wireless communications at the UE 115. A UE 115 may be configured to perform sidelink communications, uplink/downlink communications, or both, in accordance with a configured BWP switching pattern. In the context of sidelink communications, techniques described herein may enable UEs 115 to be configured with multiple BWPs within a BWP switching pattern, thereby reducing a quantity of control signaling from the network which is used to configure BWPs for sidelink communications. Accordingly, by enabling UEs 115 to be configured with BWP switching patterns including multiple BWPs, techniques described herein may reduce control signaling overhead and improve resource utilization within the wireless communications system 100.

Figure 2:
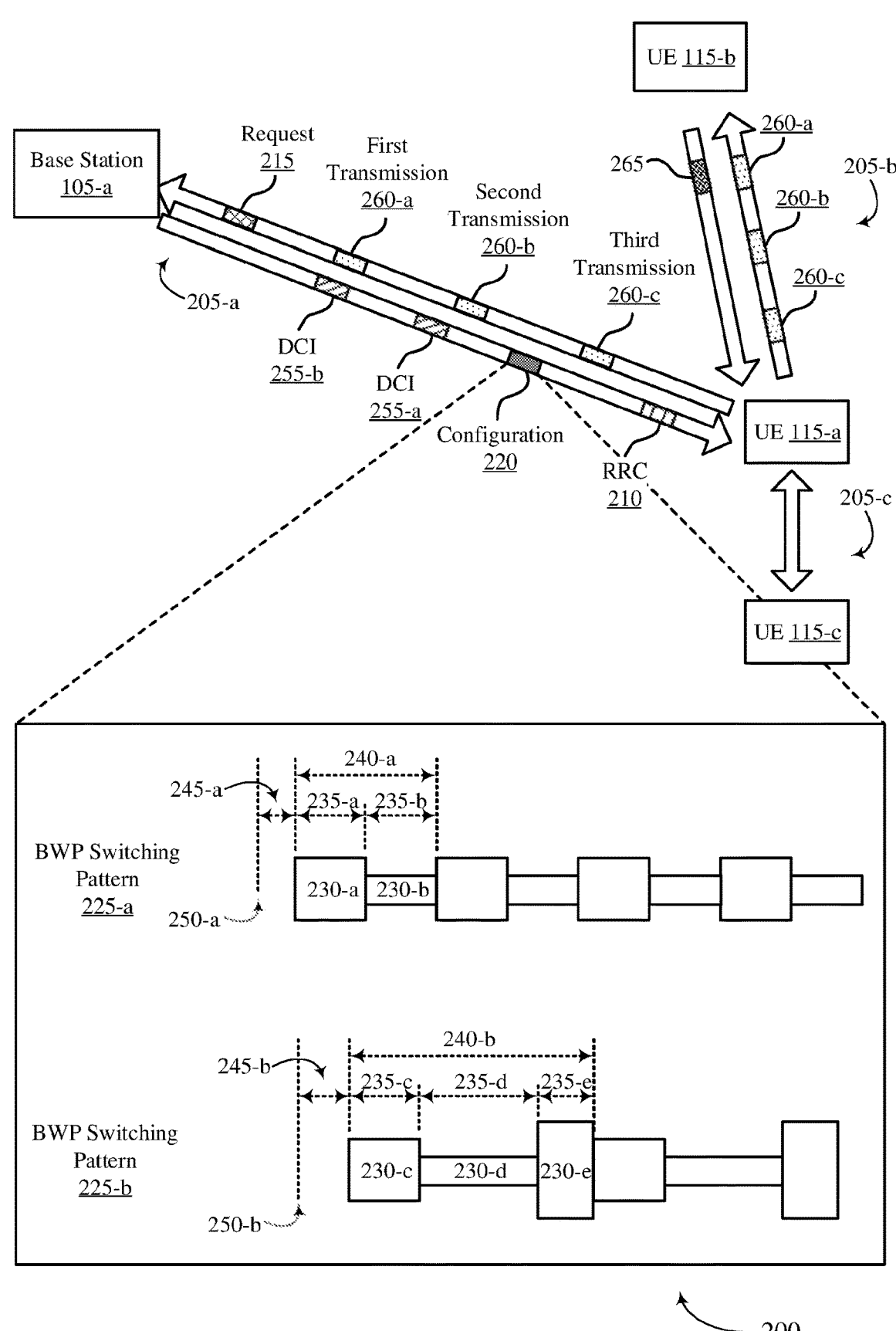
FIG. 2 illustrates an example of a wireless communications system that supports techniques for BWP switching patterns in accordance with one or more aspects of the present disclosure.

FIG. 2 illustrates an example of a wireless communications system 200 that supports techniques for BWP switching patterns in accordance with one or more aspects of the present disclosure. In some examples, wireless communications system 200 may implement, or be implemented by, aspects of wireless communications system 100. For example, wireless communications system 200 may support signaling which enables UEs 115 to be configured with BWP switching patterns for wireless communications at the respective UEs 115.

The wireless communications system 200 may include a base station 105-a, a first UE 115-a, a second UE 115-b, and a third UE 115-c, which may be examples base stations 105 and UEs 115 as described with reference to FIG. 1. The first UE 115-a may communicate with the base station 105-a using a communication link 205-a, which may be an example of an NR or LTE link between the first UE 115-a and the base station 105-a. In some cases, the communication link 205-a between the first UE 115-a and the base station 105-a may include an example of an access link (e.g., Uu link) which may include a bi-directional link that enables both uplink and downlink communication. For example, the first UE 115-a may transmit uplink signals, such as uplink control signals or uplink data signals, to the base station 105-a using the communication link 205-a and the base station 105-a may transmit downlink signals, such as downlink control signals or downlink data signals, to the first UE 115-a using the communication link 205-a.

Similarly, the first UE 115-a may communicate with the second UE 115-b and the third UE 115-c using a communication link 205-b and a communication link 205-c, respectively, which may be examples of sidelink communication links between the first UE 115-a, the second UE 115-b, and the third UE 115-c, respectively. In some cases, the communication link 205-b and the communication link 205-c between the first UE 115-a and the second UE 115-b and the third UE 115-c, respectively, may include examples of PC5 links between UEs 115.

In some aspects, communication link 205-b and communication link 205-c between the respective wireless devices (e.g., sidelink communication links) may be included within a sidelink network of the wireless communications system 200. The sidelink network (e.g., sidelink network including the communication link 205-b and/or communication link 205-c) may be configurable to operate in a "Mode 1" and/or a "Mode 2." While operating in Mode 1, the sidelink network (e.g., communication link 205-b, communication link 205-c) may be managed (e.g., coordinated) by the base station 105-a. In this regard, during Mode 1 operation, the base station 105-a may manage resource allocation over the communication link 205-b and/or communication link 205-c, and may allocate sets of resources within the communication link 205-b and communication link 205-c to the respective UE 115 (e.g., first UE 115-a, second UE 115-b, third UE 115-c). In some cases, the base station 105-a may allocate sets of sidelink resources to the respective UEs 115 during Mode 1 operation via RRC signaling, DCI messages (e.g., DCI 3_0), or both. During Mode 1 operation, the base station 105-a may allocate sidelink resources via dynamic grants, configured grants (e.g., type 1 configured grants, type 2 configured grants), or both. Within Mode 1 operation, a modulation and coding scheme (MCS) used for transmissions across communication link 205-b and/or communication link 205-c may be left up to the respective UEs 115, within limits which are pre-configured at the UEs 115 and/or signaled by the base station 105-a.

Comparatively, while operating in Mode 2, the sidelink network (e.g., communication link 205-*b*, communication link 205-*c*) may not be managed (e.g., may not be coordinated) by the base station 105-*a*. Without coordination or management of the resources of the sidelink network during the Mode 2 operation, the UEs 115-*a* and 115-*b* may be configured to monitor the sidelink network, and determine sets of sidelink resources which are available for transmission of sidelink signals via the sidelink communication link 205-*b* and/or communication link 205-*c*. The first UE 115-*a* may "autonomously" determine sidelink resources which are to be used within the communication link 205-*b* and communication link 205-*c* by monitoring the communication link 205-*b* and communication link 205-*c* (e.g., perform channel sensing), and blindly decoding physical sidelink control channels (PSCCH) channels within the respective communication links 205 to identify sidelink resources which have been reserved by other wireless devices. Subsequently, the first UE 115-*a* may report available sidelink resources to the upper layer, and may allocate sets of sidelink resources to the second UE 115-*b*. In this regard, Mode 2 operation of the sidelink network including the communication link 205-*b* and/or communication link 205-*c* may follow contention-based access procedures in which the various wireless devices (e.g., UEs 115) "compete" for the use of the sidelink network, including the communication link 205-*b* and communication link 205-*c*.

As noted previously herein, some wireless communications systems support only a single active BWP for sidelink communications, such as sidelink communications over the sidelink communication link 205-*b*. In the context of Mode 1 sidelink operations, the base station 105-*a* may transmit control signaling (e.g., RRC signaling) each time the first UE 115-*a* and/or the second UE 115-*b* is to switch from one BWP to another. This increases the control signaling overhead within the wireless communications system 200. Moreover, in some cases, the base station 105-*a* may not be able to cause both the first UE 115-*a* and the second UE 115-*b* to switch from one BWP to another simultaneously.

Accordingly, the wireless communications system 200 may support techniques for signaling BWP switching patterns which may be used for sidelink communications, uplink/downlink communications, or both. For example, the first UE 115-*a* of the wireless communications system 200 may receive a BWP switching pattern 225 from the base station 105-*a*, and may perform sidelink communications with the second UE 115-*b* in accordance with the BWP switching pattern 225. Enabling UEs 115 to be configured with BWP switching patterns 225 may reduce control signaling overhead within the wireless communications system 200. Moreover, by reducing control signaling overhead, UEs 115 may be configured with BWP switching patterns 225 which include narrow BWPs, which may reduce radio frequency operation bandwidth at the respective UEs 115 and improve power performance at the UEs 115.

For example, in some aspects, the first UE 115-*a* may receive, from the base station 105-*a*, an RRC message 210. In some aspects, the RRC message 210 may indicate a set of BWP switching patterns 225 which may be used by the first UE 115-*a*. Additionally or alternatively, the first UE 115-*a* may be configured (e.g., pre-configured) with a set of BWP switching patterns 225 (e.g., pre-configured with BWP switching patterns without the use of RRC messages 210).

As noted previously herein, each BWP switching pattern 225 may include at least a first BWP 230 and a second BWP 230 which is different from the first BWP 230. More specifically, each BWP switching pattern 225 may include a set of BWPs 230 for wireless communications performed during a set of time intervals 235, where each time interval 235 of the set of time intervals 235 is associated with a BWP 230 of the set of BWPs 230. For example, the BWP switching pattern 225-*a* may include a first BWP 230-*a* for wireless communications during a first time interval 235-*a*, a second BWP 230-*b* for wireless communications during a second time interval 235-*b*. Similarly, by way of another example, the BWP switching pattern 225-*b* may include a first BWP 230-*c* for wireless communications during a first time interval 235-*c*, a second BWP 230-*d* for wireless communications during a second time interval 235-*c*, and a third BWP 230-*e* for wireless communications during a third time interval 235-*e*.

In some aspects, each BWP switching pattern 225 may include a sequence of BWPs 230, where the sequence of BWPs 230 is repeated according to a periodicity 240. For example, the BWP switching pattern 225-*a* may include a sequence of BWPs 230 including the first BWP 230-*a* and a second BWP 230-*b*, where the sequence of BWPs 230 (e.g., sequence including the first BWP 230-*a* and the second BWP 230-*b*) is repeated according to a periodicity 240-*a*. Similarly, the BWP switching pattern 225-*b* may include a sequence of BWPs 230 including the first BWP 230-*c*, a second BWP 230-*d*, and a third BWP 230-*e*, where the sequence of BWPs 230 (e.g., sequence including the first BWP 230-*c*, the second BWP 230-*d*, and the third BWP 230-*e*) is repeated according to a periodicity 240-*b*.

In some implementations, the first UE 115-*a* may transmit, to the base station 105-*a*, a request 215 for a BWP switching pattern 225. In some aspects, the first UE 115-*a* may transmit the request 215 based on receiving the RRC message 210. For example, in some cases, the request 215 may indicate one or more of the BWP switching patterns 225 included within the set of BWP switching patterns 225 which were indicated in the RRC message 210.

In some aspects, the first UE 115-*a* may transmit the request 215 for one or more BWP switching patterns 225 based on one or more characteristics of the wireless communications network (e.g., traffic, traffic pattern, control signaling overhead, noise). For example, in some cases, the first UE 115-*a* may monitor the wireless communications network (e.g., monitor the sidelink communication link 205-*b*), determine one or more parameters/characteristics of the wireless communications network (e.g., wireless communications system 200), and may transmit the request 215 based on the determined parameters/characteristics of the wireless communications network. For instance, the first UE 115-*a* may transmit the request 215 for a BWP switching pattern 225 which will reduce noise or interference, improve a quality or reliability of transmissions performed by the first UE 115-*a*, or any combination thereof.

Additionally or alternatively, the request 215 transmitted by the first UE 115-*a* may indicate parameters associated with BWP switching at the first UE 115-*a*, parameters associated with the wireless communications network, or both. For example, in some cases, the request 215 may indicate a first set of parameters associated with BWP switching at the first UE 115-*a*, a second set of parameters associated with the wireless communications network, or both. Parameters associated with BWP switching at the first UE 115-*a* may include indications as to which BWPs 230 are supported at the first UE 115-*a*, an indication of a preference of widths of BWPs 230 in the frequency domain (e.g., preference for wider or narrower BWPs 230), a duration of BWP switching procedures at the first UE 115-*a*, a periodicity 240 of a BWP switching pattern 225, or any combination thereof. Moreover, as noted previously herein, parameters associated with the wireless communications network which may be indicated via the request 215 may include identified traffic, traffic patterns, noise, control signaling overhead, or any combination thereof.

In some aspects, the first UE 115-*a* may receive, from the base station 105-*a*, a configuration 220 for a BWP switching pattern 225 for wireless communications performed at the first UE 115-*a*. In some aspects, the BWP switching pattern 225 may be associated with sidelink communications between the first UE 115-*a* and the second UE 115-*b*, sidelink communications between the first UE 115-*a* and the third UE 115-*c*, uplink/downlink communications between the first UE 115-*a* and the base station 105-*a*, or any combination thereof. In some aspects, the configuration 220 for the BWP switching pattern 225 may be indicated via control signaling including one or more PDSCH transmissions. For example, the configuration 220 for the BWP switching pattern 225 may be indicated via a PDSCH transmission including an RRC message (e.g., RRC message 210), a MAC-CE message, or both.

In some aspects, the first UE 115-*a* may receive the configuration 220 for the BWP switching pattern 225 based on receiving the RRC message 210, transmitting the request 215, or both. For example, the configuration 220 for the BWP switching pattern 225 may include a BWP switching pattern 225 which is included in the set of BWP switching patterns 225 indicated via the RRC message 210. By way of another example, the base station 105-*a* may transmit the configuration 220 for the BWP switching pattern 225 based on (e.g., in response to) receiving the request 215. In some cases, the base station 105-*a* may transmit the configuration 220 for the BWP switching pattern 225 based on (e.g., in accordance with) the one or more parameters associated with BWP switching at the first UE 115-*a* and/or parameters of the wireless communications network, which were indicated via the request 215. For instance, in cases where the request 215 indicates a duration of BWP switching procedures at the first UE 115-*a*, the BWP switching pattern 225 indicated via the configuration 220 may be based on the indication of the duration of the BWP switching procedures.

In some aspects, the base station 105-*a* may additionally indicate one or more parameters associated with the BWP switching pattern 225 via the configuration 220. For example, in cases where the configuration 220 for the BWP switching pattern 225 is indicated via a PDSCH transmission, the PDSCH transmission may include a set of parameters associated with the BWP switching pattern 225. Parameters associated with a BWP switching pattern 225 may include, but are not limited to, a periodicity 240 of the BWP switching pattern 225, a sequence of BWPs 230 within the BWP switching pattern 225, an indication of a starting time for the BWP switching pattern 225 (e.g., time offset 245 for the BWP switching pattern 225), a set of time intervals 235 associated with a set of BWPs 230 of the BWP switching pattern 225, a duration in which the BWP switching pattern 225 is to be applied (e.g., quantity of cycles of the BWP switching pattern 225), or any combination thereof. Additionally or alternatively, the configuration 220 may indicate whether communications performed according to the BWP switching pattern 225 are associated with unicast communications, broadcast communications, multicast communications, or any combination thereof.

For example, in some cases, the configuration 220 for the BWP switching pattern 225 may be indicated via a PDSCH transmission, where the PDSCH transmission indicates a first BWP 230-*a* for wireless communications during a first time interval 235-*a* and a second BWP 230-*b* for wireless communications during a first time interval 235-*b*. In this example, the PDSCH transmission may indicate each of the first BWP 230-*a* and the second BWP 230-*b*, durations of the first time interval 235-*a* and the second time interval 235-*b*, and the like.

Additionally or alternatively, the PDSCH transmission may indicate a starting time for the BWP switching pattern 225, which indicates a starting time at which the first UE 115-*a* is to activate the first BWP 230 (e.g., BWP 230-*a*, BWP 230-*c*) of the BWP switching pattern 225. In some cases, the starting time for the BWP switching pattern 225 may be indicated via a time offset 245 which is measured relative to a reference time 250. For example, in cases where the first UE 115-*a* is configured with the BWP switching pattern 225-*a*, the configuration 220 may indicate that the first UE 115-*a* is to activate the first BWP 230-*a* of the BWP switching pattern 225-*a* following a time offset 245-*a* which is measured relative to a reference time 250-*a*. In some cases, the reference time 250-*a* may include a time at which the configuration 220 (e.g., PDSCH transmission including the configuration 220) was transmitted by the base station 105-*a*, received by the first UE 115-*a*, or both. The reference time may additionally include any other time against which the time offset 245-*a* may be measured.

In some aspects, the first UE 115-*a* may receive a DCI message 255-*a* from the base station 105-*a*. In some aspects, the first UE 115-*a* may receive the DCI message 255-*a* based on receiving the RRC message 210, transmitting the request 215, receiving the configuration 220 for the BWP switching pattern 225 (e.g., PDSCH transmission including the configuration 220), or any combination thereof. In some aspects, the DCI message 255-*a* may include an indication for the first UE 115-*a* to begin performing communications (e.g., transmission 260) according to the BWP switching pattern 225. In this regard, the DCI message 255-*a* may be said to "activate" the BWP switching pattern 225. For example, the DCI message 255-*a* may include an indication for the first UE 115-*a* to perform wireless communications according to the BWP switching pattern 225, and may therefore include an indication for the first UE 115-*a* to activate the first BWP 230 of the respective BWP switching pattern 225.

Additionally or alternatively, the DCI message 255-*a* may adjust one or more parameters associated with the BWP switching pattern 225. For example, in cases where the configuration 220 for the BWP switching pattern 225 is indicated via a PDSCH transmission which includes a set of parameters for the BWP switching pattern 225, the DCI message 255-*a* may indicate at least one parameter which is different from the set of parameters for the BWP switching pattern 225. In this regard, techniques described herein may enable the base station 105-*a* to selectively modify parameters of a BWP switching pattern 225 (e.g., BWPs 230 within the BWP switching pattern 225, a sequence of BWPs 230 within the BWP switching pattern 225, a time interval 235 associated with the respective BWPs 230 of the BWP switching pattern 225) without fully re-configuring a new BWP switching pattern 225. In this regard, by enabling for the BWP switching pattern 225 to be modified via DCI messages 255, techniques described herein may further reduce control signaling within the wireless communications network (e.g., wireless communications system 200).

In some aspects, the first UE 115-*a* may activate the first BWP 230 of the BWP switching pattern 225. For example, in cases where the first UE 115-*a* is configured with the BWP switching pattern 225-*a*, the first UE 115-*a* may activate the first BWP 230-*a* of the BWP switching pattern 225-*a*. By way of another example, in cases where the first UE 115-*a* is configured with the BWP switching pattern 225-*b*, the first UE 115-*a* may activate the first BWP 230-*d* of the BWP switching pattern 225-*b*. As noted previously herein, the first UE 115-*a* may activate the first BWP 230 of the respective BWP switching pattern 225 in order to preform wireless communications according to the activated BWP 230. In some aspects, the first UE 115-*a* may activate the first BWP 230 based on performing a beam switching procedure, a BWP switching procedure, or both. Moreover, the first UE 115-*a* may activate the first BWP 230 based on receiving the RRC message 210, transmitting the request 215, receiving the configuration 220 for the BWP switching pattern 225, receiving the DCI message 255-*a*, or any combination thereof.

For example, in some cases, the first UE 115-*a* may be configured to activate the BWP switching pattern 225-*a* (e.g., activate the first BWP 230-*a* of the BWP switching pattern 225-*a*) and begin performing wireless communications according to the BWP switching pattern 225-*a* upon receiving the configuration 220. In such cases, the first UE 115-*a* may be configured to begin using the BWP switching pattern 225-*a* without any further activation received from the base station 105-*a*. Conversely, by way of another example, the first UE 115-*a* may be configured to activate the first BWP 230-*a* of the BWP switching pattern 225-*a* and begin performing wireless communications according to the BWP switching pattern 225-*a* based on receiving an activation of the BWP switching pattern 225-*a*. For instance, the first UE 115-*a* may activate the first BWP 230-*a* of the BWP switching pattern 225-*a* based on receiving the DCI message 255-*a* includes an indication of an activation of the BWP switching pattern 225.

In some implementations, the first UE 115-*a* may transmit an indication of the BWP switching pattern 225 to the second UE 115-*b*. In some aspects, the first UE 115-*a* may transmit the indication of the BWP switching pattern 225 to the second UE 115-*b* based on performing a beam switching procedure, a BWP switching procedure, or both. Moreover, the first UE 115-*a* may transmit the indication of the BWP switching pattern 225 to the second UE 115-*b* based on receiving the RRC message 210, transmitting the request 215, receiving the configuration 220 for the BWP switching pattern 225, receiving the DCI message 255-*a*, activating the first BWP 230 of the BWP switching pattern 225, or any combination thereof.

Transmitting the indication of the BWP switching pattern 225 to the second UE 115-*b* may enable the second UE 115-*b* to perform wireless communications according to the BWP switching pattern 225. For example, in cases where the BWP switching pattern 225-*b* is associated with sidelink communications between the first UE 115-*a* and the second UE 115-*b*, the first UE 115-*a* may inform the second UE 115-*b* of the BWP switching pattern 225-*b* so that the first UE 115-*a* and the second UE 115-*b* may exchange sidelink transmissions (e.g., transmissions 265) based on (e.g., in accordance with) the BWP switching pattern 225-*b*. In some cases, informing the second UE 115-*b* of the BWP switching pattern 225 may further reduce control signaling overhead within the wireless communications network, and improve robustness of wireless communications. For example, by transmitting the indication of the BWP switching pattern 225 to the second UE 115-*b*, the first UE 115-*a* may refrain from transmitting control signaling to the second UE 115-*b* each time it is to switch BWPs 230 for communications between the first UE 115-*a* and the second UE 115-*b*.

In some implementations, the first UE 115-*a* may transmit an indication of the BWP switching pattern 225 to multiple UEs 115. For example, in cases where the configuration 220 indicates that the BWP switching pattern 225 is associated with broadcast communications and/or multicast communications, the first UE 115-*a* may transmit an indication of the BWP switching pattern 225 to both the second UE 115-*b* and the third UE 115-*c*.

In additional or alternative implementations, instead of indicating the entire BWP switching pattern to the second UE 115-*b*, the first UE 115-*a* may transmit an indication of the first BWP 230 of the respective BWP switching pattern 225. For example, in cases where the first UE 15-*a* is configured with the BWP switching pattern 225-*a*, the first UE 115-*a* may transmit an indication of the first BWP 230-*a* to the second UE 115-*b*. By way of another example, in cases where the first UE 15-*a* is configured with the BWP switching pattern 225-*b*, the first UE 115-*a* may transmit an indication of the first BWP 230-*c* to the second UE 115-*b*.

In some cases, the first UE 115-*a* may transmit the indication of the first BWP 230 in lieu of transmitting the indication of the full BWP switching pattern 225. By transmitting the indication of the first BWP 230 of the BWP switching pattern 225, the first UE 115-*a* may be able to communicate with the second UE 115-*b* based on (e.g., according to) the first BWP 230 of the configured BWP switching pattern 225. Transmitting the indication of the first BWP 230 of the respective BWP switching pattern 225 may additionally reduce a size of the indication as compared to transmitting an indication of the entire BWP switching pattern 225. However, it is noted herein that transmitting indications of individual BWPs 230 may increase sidelink control signaling overhead as compared to transmitting indications of a BWP switching pattern 225 as a whole, as the first UE 115-*a* may transmit control signaling to the second UE 115-*b* each time wireless communications are to be performed according to a new BWP 230 of the BWP switching pattern 225.

As noted previously herein, in some implementations, the first UE 115-*a* may transmit an indication of the first BWP 230 of the BWP switching pattern 225 to multiple UEs 115. For example, in cases where the configuration 220 indicates that the BWP switching pattern 225 is associated with broadcast communications and/or multicast communications, the first UE 115-*a* may transmit an indication of the first BWP 230 of the BWP switching pattern 225 to both the second UE 115-*b* and the third UE 115-*c*.

In some aspects, the first UE 115-*a* may transmit a first transmission 260-*a* to one or more devices of the wireless communications network based on (e.g., in accordance with) the BWP switching pattern 225. For example, as shown in FIG. 2, the first UE 115-*a* may transmit the first transmission 260-*a* to the base station 105-*a*, the second UE 115-*b*, or both. For instance, in cases where the BWP switching pattern 225 is associated with unicast sidelink communications, the first transmission 260-*a* may include a sidelink transmission from the first UE 115-*a* to the third device 305-*a*. By way of another example, in cases where the BWP switching pattern 225 is associated with broadcast communications, multicast communications, or both, the first UE 115-*a* may transmit the first transmission 260-*a* to the second UE 115-*b*, the third UE 115-*c*, or both.

In some aspects, the first UE 115-*a* may transmit the first transmission 260-*a* based on receiving the RRC message 210, transmitting the request 215, receiving the configuration 220 for the BWP switching pattern 225, receiving the DCI message 255-*a*, activating the first BWP 320 of the BWP switching pattern 225, transmitting the indication of the BWP switching pattern 225 to the second UE 115-*b*, transmitting the indication of the first BWP 230 of the BWP switching pattern 225 to the second UE 115-*b*, or any combination thereof. For example, the first UE 115-*a* may transmit the first transmission 260-*a* based on (e.g., in accordance with) the first BWP 230 of the BWP switching pattern 225, as indicated to the second UE 115-*b*.

In additional or alternative implementations, the first UE 115-*a* may receive transmissions from the base station 105-*b*, the second UE 115-*b*, the third UE 115-*c*, or any combination thereof, in accordance with the BWP switching pattern 225. For example, as shown in FIG. 2, the first UE 115-*a* may receive a sidelink transmission 265 from the second UE 115-*b*, where the sidelink transmission 265 is transmitted/received in accordance with the BWP switching pattern 225. For instance, the second UE 115-*b* may transmit the sidelink transmission 265 in accordance with the first BWP 230 of the respective BWP switching pattern 225.

In some cases, the first UE 115-*a* may transmit, to the second UE 115-*b*, the third UE 115-*c*, or both, an indication of a BWP switching procedure from the first BWP 230 of the BWP switching pattern 225 to the second BWP 230 of the BWP switching pattern 225. For example, in cases where the first UE 115-*a* does not inform the second UE 115-*b* of the full BWP switching pattern 225, the first UE 115-*a* may indicate that the first UE 115-*a* is to switch from the first BWP 230 to the second BWP 230 of the respective BWP switching pattern. For instance, in cases where the first UE 115-*a* is configured to perform sidelink communications with the second UE 115-*b* based on the BWP switching pattern 225-*b*, the first UE 115-*a* may transmit an indication that the first UE 115-*a* (and the second UE 115-*b*) are to perform a BWP switching procedure from the first BWP 230-*c* to the second BWP 230-*d* of the BWP switching pattern. In this regard, the first UE 115-*a* may transmit an indication to the second UE 115-*b* that subsequent transmissions between the first UE 115-*a* and the second UE 115-*b* may be performed based on (e.g., in accordance with) the second BWP 230-*d* of the BWP switching pattern 225-*b*. Conversely, it is noted herein that the separate indication of the BWP switching procedure may be unnecessary in cases where the first UE 115-*a* transmits the indication of the entire BWP switching pattern 225.

In some aspects, the first UE 115-*a* may perform a BWP switching procedure from the first BWP 230 to a second BWP 230 of the configured BWP switching pattern 225 to activate the second BWP 230. For example, in cases where the first UE 115-*a* is configured with the BWP switching pattern 225-*b*, the first UE 115-*a* may perform a BWP switching procedure from the first BWP 230-*c* to the second BWP 230-*d* in order to activate the second BWP 230-*d*. In some cases, the BWP switching procedure may include a beam switching procedure. The first UE 115-*a* my be configured to perform the BWP switching procedure based on (e.g., in accordance with) the BWP switching pattern 225. Moreover, the first UE 115-*a* may be configured to perform the BWP switching procedure based on transmitting the indication of the BWP switching pattern 225 to the second UE 115-*b*, based on transmitting the indication of the BWP switching procedure to the second UE 115-*b*, or both. For example, the first device 305-*b* may perform the BWP switching procedure from the first BWP 230-*c* to the second BWP 230-*d* of the BWP switching pattern 225-*b* to activate the second BWP 230-*d* and to perform subsequent transmissions in accordance with the second BWP 230-*d*. In this regard, the first UE 115-*a* may activate the second BWP 230 of the BWP switching pattern 225 based on performing the BWP switching procedure.

Upon performing the BWP switching procedure, the first UE 115-*a* may transmit a second transmission 260-*b* to the one or more devices of the wireless communications network based on (e.g., in accordance with) the BWP switching pattern 225. For example, as shown in FIG. 2, the first UE 115-*a* may transmit the second transmission 260-*b* to the base station 105-*a*, the second UE 115-*b*, the third UE 115-*c*, or any combination thereof. For instance, in cases where the BWP switching pattern 225 is associated with unicast communications, the second transmission 260-*b* may include a sidelink transmission from the first UE 115-*a* to the second UE 115-*b*. By way of another example, in cases where the BWP switching pattern 225 is associated with broadcast communications, multicast communications, or both, the first UE 115-*a* may transmit the second transmission 260-*b* to the second UE 115-*b*, the third UE 115-*c*, or both.

In some aspects, the first UE 115-*a* may transmit the second transmission 260-*b* based on receiving the RRC message 210, transmitting the request 215, receiving the configuration 220 for the BWP switching pattern 225, receiving the DCI message 255-*a*, activating the first BWP 230 of the BWP switching pattern 225, transmitting the indication of the BWP switching pattern 225 to the second UE 115-*b*, transmitting the indication of the first BWP 320 to the second UE 115-*b*, transmitting the first transmission 260-*a*, transmitting the indication of the BWP switching procedure, performing the BWP switching procedure, activating the second BWP 230 of the BWP switching pattern 225, or any combination thereof.

For example, the first UE 115-*a* may transmit the second transmission 260-*b* based on (e.g., in accordance with) the second BWP 230-*b* of the BWP switching pattern 225-*a*. By way of another example, the first UE 115-*a* may be configured to transmit the first transmission 260-*a* and/or the second transmission 260-*b* based on (e.g., in accordance with) the set of parameters associated with the BWP switching pattern 225 which was indicated via the configuration 220 (e.g., indicated via a PDSCH transmission indicating the configuration 220 for the BWP switching pattern 225).

In some aspects, the first UE 115-*a* may receive a DCI message 255-*b* from the base station 105-*a*. In some aspects, the DCI message 255-*b* may include an indication for the first UE 115-*a* to refrain from performing subsequent transmissions according to the BWP switching pattern 225. In this regard, the DCI message 255-*b* may be said to "deactivate" the BWP switching pattern 225. In such cases, the first UE 115-*a* may be configured to refrain from performing any subsequent transmissions 260, may perform subsequent transmissions 260 according to a different configuration 220 (e.g., a default BWP switching pattern 225, a default wireless communications configuration 220), or any combination thereof. Additionally or alternatively, the DCI message 255-*b* may adjust one or more parameters associated with the BWP switching pattern 225.

The first UE 115-*a* may transmit a third transmission 260-*c* to the one or more devices of the wireless communications network (e.g., base station 105-*a*, second UE 115-*b*, or both). In some aspects, the first UE 115-*a* may transmit the third transmission 260-*c* based on (e.g., in accordance with) the DCI message 255-*b*. For example, in cases where the DCI message 255-*b* indicates for the first UE 115-*a* to refrain from performing subsequent transmissions 260 according to the BWP switching pattern 225 (e.g., the DCI message 255 deactivates the BWP switching pattern 225), the first UE 115-*a* may transmit the third transmission according to a second configuration 220 which is different from the configuration 220 for the BWP switching pattern 225. In this example, the second configuration 220 may include a second configuration 220 associated with a second (e.g., default) BWP switching pattern 225 which is different from the original BWP switching pattern 225. In additional or alternative cases, the first UE 115-*a* may refrain from performing subsequent transmissions 260 (e.g., refrain from performing the third transmission 260-*c*) in cases where the DCI message 255-*b* deactivates the BWP switching pattern 225. In such cases, the first UE 115-*a* may refrain from performing the third transmission 260-*c* (and other transmissions) until the first UE 115-*a* receives an additional DCI message 255 which re-activates the BWP switching pattern 225 and/or activates a new BWP switching pattern 225.

Additionally or alternatively, the third transmission 260-*c* may be performed based on allocations of time/frequency resources received from the second device 305-*c* (e.g., in accordance with dynamic grants). By way of another example, in cases where the DCI message 255-*b* modifies one or more parameters associated with the BWP switching pattern 225, the third transmission 260-*c* may be performed in accordance with the modified parameters indicated via the DCI message 255-*b*.

Techniques described herein may enable the first UE 115-*c* to be configured with one or more BWP switching patterns 225, which may be used for wireless communications at the first UE 115-*a*. A UE 115 may be configured to perform sidelink communications, uplink/downlink communications, or both, in accordance with a configured BWP switching pattern 225. In the context of sidelink communications, techniques described herein may enable UEs 115 to be configured with multiple BWPs within a BWP switching pattern 225, thereby reducing a quantity of control signaling from the network which is used to configure BWPs for sidelink communications. Accordingly, by enabling UEs 115 to be configured with BWP switching patterns 225 including multiple BWPs, techniques described herein may reduce control signaling overhead and improve resource utilization within the wireless communications system.

Figure 3:
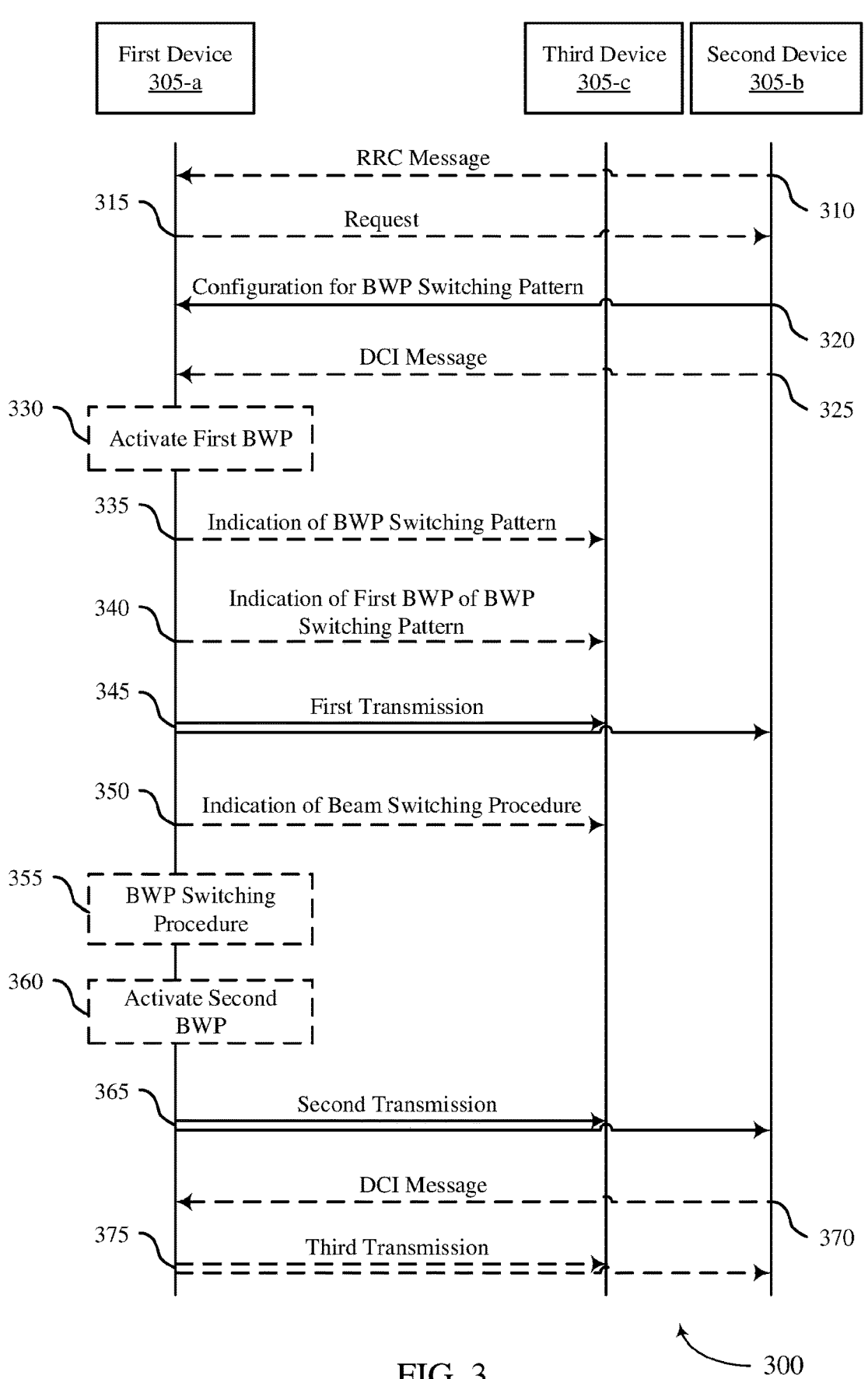
FIG. 3 illustrates an example of a process flow that supports techniques for BWP switching patterns in accordance with one or more aspects of the present disclosure.

FIG. 3 illustrates an example of a process flow 300 that supports techniques for BWP switching patterns in accordance with one or more aspects of the present disclosure. In some examples, process flow 300 may implement, or be implemented by, aspects of wireless communications systems 100, wireless communications system 200, or both. For example, the process flow 300 may illustrate a first device 305-*a* receiving a BWP switching pattern from a base station, and performing wireless communications (e.g., sidelink transmissions, uplink transmissions) in accordance with the indicated BWP switching pattern, as described with reference to FIGS. 1-2.

In some cases, process flow 300 may include devices of a wireless communications network including a first device 305-*a*, a second device 305-*b*, and a third device 305-*c*, which may be examples of corresponding devices as described herein. The first device 305-*a* and the third device 305-*c* illustrated in FIG. 3 may include examples of the first UE 115-*a* and the second UE 115-*b*, respectively, as illustrated in FIG. 2. Similarly, the second device 305-*b* illustrated in FIG. 3 may include an example of the base station 105-*a* illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 310, the first device 305-*a* (e.g., first UE 115) may receive, from the second device 305-*b* (e.g., base station 105), an RRC message. In some aspects, the RRC message may indicate a set of BWP switching patterns which may be used by the first device 305-*a*. Additionally or alternatively, the first device 305-*a* may be configured (e.g., pre-configured) with a set of BWP switching patterns.

At 315, the first device 305-*a* may transmit, to the second device 305-*b*, a request for a BWP switching pattern. In some aspects, the first device 305-*a* may transmit the request at 315 based on receiving the RRC message at 310. For example, in some cases, the request may indicate one or more of the BWP switching patterns included within the set of BWP switching patterns which were indicated in the RRC message received at 310.

In some aspects, the first device 305-*a* may request one or more BWP switching patterns based on one or more characteristics of the wireless communications network (e.g., traffic, control signaling overhead, noise). For example, in some cases, the first device 305-*a* may monitor the wireless communications network (e.g., monitor a sidelink communication link), determine one or more parameters/characteristics of the wireless communications network, and may transmit the request based on the determined parameters/characteristics of the wireless communications network. For instance, the first device 305-*a* may request a BWP switching pattern which will reduce noise or interference, improve a quality or reliability of transmissions performed by the first device 305-*a*, or any combination thereof.

Additionally or alternatively, the request transmitted by the first device 305-*a* may indicate parameters associated with BWP switching at the first device 305-*a*, parameters associated with the wireless communications network, or both. For example, in some cases, the request transmitted at 325 may indicate a first set of parameters associated with BWP switching at the first device 305-*a*, a second set of parameters associated with the wireless communications network, or both. Parameters associated with BWP switching at the first device 305-*a* may include indications as to which BWPs are supported at the first device 305-*a*, an indication of a preference of widths of BWPs in the frequency domain (e.g., preference for wider or narrower BWPs), a duration of BWP switching procedures at the first device 305-*a*, a periodicity of a BWP switching pattern, or any combination thereof. Moreover, as noted previously herein, parameters associated with the wireless communications network which may be indicated via the request may include identified traffic, noise, control signaling overhead, or any combination thereof.

At 320, the first device 305-*a* may receive, from the second device 305-*b*, a configuration for a BWP switching pattern for wireless communications performed at the first device 305-*a*. In some aspects, the BWP switching pattern may be associated with sidelink communications between the first device 305-*a* and the third device 305-*c*, uplink/downlink communications between the first device 305-*a* and the second device 305-*b*, or both. The BWP switching pattern may include at least a first BWP and a second BWP different from the first BWP. More specifically, the BWP switching pattern may include a set of BWP for wireless communications performed during a set of time intervals, where each time interval of the set of time intervals is associated with a BWP of the set of BWPs. For example, the BWP switching pattern may include a first BWP for wireless communications during a first time interval, a second BWP for wireless communications during a second time interval, and the like. In some aspects, the configuration for the BWP switching pattern may be indicated via control signaling including one or more PDSCH transmissions. For example, the configuration for the BWP switching pattern may be indicated via a PDSCH transmission including an RRC message, a MAC-CE message, or both.

In some aspects, the first device 305-*a* may receive the configuration for the BWP switching pattern at 320 based on receiving the RRC message at 310, transmitting the request at 315, or both. For example, the configuration for the BWP switching pattern indicated at 320 may include a BWP switching pattern which is included in the set of BWP switching patterns indicated via the RRC message at 310. By way of another example, the second device 305-*b* may transmit the configuration for the BWP switching pattern at 320 based on (e.g., in response to) receiving the request at 315. In some cases, the second device 305-*b* may transmit the configuration for the BWP switching pattern based on (e.g., in accordance with) the one or more parameters associated with BWP switching at the first device 305-*a* and/or parameters of the wireless communications network, which were indicated via the request at 315. For instance, in cases where the request indicates a duration of BWP switching procedures at the first device 305-*a*, the BWP switching pattern indicated at 320 may be based on the indication of the duration of the BWP switching procedures.

In some aspects, the second device 305-*b* may additionally indicate one or more parameters associated with the BWP switching pattern at 320. For example, in cases where the configuration for the BWP switching pattern is indicated via a PDSCH transmission, the PDSCH transmission may include a set of parameters associated with the BWP switching pattern. Parameters associated with a BWP switching pattern may include, but are not limited to, a periodicity of the BWP switching pattern, a sequence of BWPs within the BWP switching pattern, an indication of a starting time for the BWP switching pattern (e.g., time offset for the BWP switching pattern), a set of time intervals associated with a set of BWPs of the BWP switching pattern, a duration in which the BWP switching pattern is to be applied (e.g., quantity of cycles of the BWP switching pattern), or any combination thereof.

For example, in some cases, the BWP switching pattern indicated via a PDSCH transmission at 320 may include a first BWP for wireless communications during a first time interval and a second BWP for wireless communications during a first time interval. In this example, the PDSCH transmission may indicate each of the first BWP and the second BWP, durations of the first time interval and the second time interval, and the like. Additionally or alternatively, the PDSCH transmission may indicate a starting time (e.g., time offset) for the BWP switching pattern, which indicates that the first device 305-*a* is to activate the first BWP of the BWP switching pattern based on (e.g., in accordance with) the indicated starting time and/or time offset.

At 325, the first device 305-*a* may receive a DCI message from the second device 305-*b*. In some aspects, the first device 305-*a* may receive the DCI message based on receiving the RRC message at 310, transmitting the request at 315, receiving the configuration for the BWP switching pattern at 320, or any combination thereof.

In some aspects, the DCI message received at 325 may include an indication for the first device 305-*a* to begin performing transmissions according to the BWP switching pattern. In this regard, the DCI message may be said to "activate" the BWP switching pattern. For example, the DCI message may include an indication for the first device 305-*a* to perform wireless communications according to the BWP switching pattern, and may therefore include an indication for the first device 305-*a* to activate the first BWP of the BWP switching pattern.

Additionally or alternatively, the DCI message received at 325 may adjust one or more parameters associated with the BWP switching pattern. For example, in cases where the BWP switching pattern is indicated via a PDSCH transmission at 320 which includes a set of parameters for the BWP switching pattern, the DCI message may indicate at least one parameter which is different from the set of parameters for the BWP switching pattern. In this regard, techniques described herein may enable the second device 305-*b* to selectively modify parameters of a BWP switching pattern (e.g., BWPs within the BWP switching pattern, a sequence of BWPs within the BWP switching pattern, a time interval associated with the respective BWPs of the BWP switching pattern) without fully re-configuring a new BWP switching pattern. In this regard, by enabling for the BWP switching pattern to be modified via DCI messages, techniques described herein may further reduce control signaling within the wireless communications network.

At 330, the first device 305-*a* may activate the first BWP of the BWP switching pattern. As noted previously herein, the first device 305-*a* may activate the first BWP of the BWP switching pattern in order to preform wireless communications according to the activated BWP. In some aspects, the first device 305-*a* may activate the first BWP based on performing a beam switching procedure, a BWP switching procedure, or both. Moreover, the first device 305-*a* may activate the first BWP based on receiving the RRC message at 310, transmitting the request at 315, receiving the configuration for the BWP switching pattern at 320, receiving the DCI message at 325, or any combination thereof.

For example, in some cases, the first device 305-*a* may be configured to activate the first BWP of the BWP switching pattern and begin performing wireless communications according to the BWP switching pattern upon receiving the configuration at 320. In such cases, the first device 305-*a* may be configured to begin using the BWP switching pattern without any further activation received from the second device 305-*b*. Conversely, by way of another example, the first device 305-*a* may be configured to activate the first BWP switching pattern and begin performing wireless communications according to the BWP switching pattern based on receiving an activation of the BWP switching pattern. For instance, the first device 305-*a* may activate the first BWP of the BWP switching pattern based on receiving the DCI message at 325 which includes an indication of an activation of the BWP switching pattern.

At 335, the first device 305-*a* may transmit an indication of the BWP switching pattern to the third device 305-*c*. In some aspects, the first device 305-*a* may transmit the indication of the BWP switching pattern to the third device 305-*c* based on performing a beam switching procedure, a BWP switching procedure, or both. Moreover, the first device 305-*a* may transmit the indication of the BWP switching pattern based on receiving the RRC message at 310, transmitting the request at 315, receiving the configuration for the BWP switching pattern at 320, receiving the DCI message at 325, activating the first BWP of the BWP switching pattern at 335, or any combination thereof.

Transmitting the indication of the BWP switching pattern to the third device 305-*c* may enable the third device 305-*c* to perform wireless communications according to the BWP switching pattern. For example, in cases where the BWP switching pattern is associated with sidelink communications between the first device 305-*a* and the third device 305-*c*, the first device 305-*a* may inform the third device 305-*c* of the BWP switching pattern at 335 so that the first device 305-*a* and the third device 305-*c* may exchange sidelink transmissions based on (e.g., in accordance with) the BWP switching pattern. In some cases, informing the third device 305-*c* of the BWP switching pattern may further reduce control signaling overhead within the wireless communications network, and improve robustness of wireless communications. For example, by transmitting the indication of the BWP switching pattern to the third device 305-*c*, the first device 305-*a* may refrain from transmitting control signaling to the third device 305-*c* each time it is to switch BWPs for communications between the first device 305-*a* and the third device 305-*c*.

At 340, the first device 305-*a* may transmit an indication of the first BWP of the BWP switching pattern. In some cases, the first device 305-*a* may transmit the indication of the first BWP at 340 in lieu of transmitting the indication of the full BWP switching pattern at 335. By transmitting the indication of the first BWP of the BWP switching pattern, the first device 305-*a* may be able to communicate with the third device 305-*c* based on (e.g., according to) the first BWP. Transmitting the indication of the first BWP may additionally reduce a size of the indication as compared to transmitting an indication of the entire BWP switching pattern. However, it is noted herein that transmitting indications of individual BWPs may increase control signaling overhead as compared to transmitting indications of a BWP switching procedure, as the first device 305-*a* may transmit control signaling to the third device 305-*c* each time wireless communications are to be performed according to a new BWP of the BWP switching pattern.

At 345, the first device 305-*a* may transmit a first transmission to one or more devices of the wireless communications network based on (e.g., in accordance with) the BWP switching pattern. For example, as shown in FIG. 3, the first device 305-*a* may transmit a first transmission to the second device 305-*b*, the third device 305-*c*, or both. For instance, in cases where both the first device 305-*a* and the third device 305-*c* include UEs 115, the first transmission may include a sidelink transmission from the first device 305-*a* to the third device 305-*a*.

In some aspects, the first device 305-*a* may transmit the first transmission at 345 based on receiving the RRC message at 310, transmitting the request at 315, receiving the configuration for the BWP switching pattern at 320, receiving the DCI message at 325, activating the first BWP of the BWP switching pattern at 335, transmitting the indication of the BWP switching pattern at 335, transmitting the indication of the first BWP at 340, or any combination thereof. For example, the first device 305-*a* may transmit the first transmission at 345 based on (e.g., in accordance with) the first BWP of the BWP switching pattern.

At 350, the first device 305-*a* may transmit, to the third device 305-*c*, an indication of a BWP switching procedure from the first BWP of the BWP switching pattern to the second BWP of the BWP switching pattern. For example, in cases where the first device 305-*a* does not inform the third device 305-*c* of the full BWP switching pattern at 335, the first device 305-*a* may indicate that the first device 305-*a* is to switch from the first BWP to the second BWP. In this regard, the first device 305-*a* may transmit an indication to the third device 305-*c* that subsequent transmissions between the first device 305-*a* and the third device 305-*c* may be performed based on (e.g., in accordance with) the second BWP switching pattern. Conversely, it is noted herein that the separate indication of the BWP switching procedure may be unnecessary in cases where the first device 305-*a* transmits the indication of the entire BWP switching pattern at 335.

At 355, the first device 305-*a* may perform a BWP switching procedure from the first BWP to a second BWP to activate the second BWP. The first device 305-*a* my be configured to perform the BWP switching procedure based on (e.g., in accordance with) the BWP switching pattern. Moreover, the first device 305-*a* may be configured to perform the BWP switching procedure based on transmitting the indication of the BWP switching pattern at 335, based on transmitting the indication of the BWP switching procedure at 350, or both. For example, the first device 305-*b* may perform the BWP switching procedure from the first BWP to the second BWP to activate the second BWP and to perform subsequent transmissions in accordance with the second BWP.

At 360, the first device 305-*a* may activate the second BWP of the BWP switching pattern. In some aspects, the first device 305-*a* may activate the second BWP based on performing the BWP switching procedure at 355.

At 365, the first device 305-*a* may transmit a second transmission to the one or more devices of the wireless communications network based on (e.g., in accordance with) the BWP switching pattern. For example, as shown in FIG. 3, the first device 305-*a* may transmit the second transmission to the second device 305-*b*, the third device 305-*c*, or both. For instance, in cases where both the first device 305-*a* and the third device 305-*c* include UEs 115, the second transmission may include a sidelink transmission from the first device 305-*a* to the third device 305-*a*.

In some aspects, the first device 305-*a* may transmit the second transmission at 365 based on receiving the RRC message at 310, transmitting the request at 315, receiving the configuration for the BWP switching pattern at 320, receiving the DCI message at 325, activating the first BWP of the BWP switching pattern at 335, transmitting the indication of the BWP switching pattern at 335, transmitting the indication of the first BWP at 340, transmitting the first transmission at 345, transmitting the indication of the BWP switching procedure at 350, performing the BWP switching procedure at 355, activating the second BWP of the BWP switching pattern at 360, or any combination thereof. For example, the first device 305-*a* may transmit the second transmission at 365 based on (e.g., in accordance with) the second BWP of the BWP switching pattern. By way of another example, the first device 305-*a* may be configured to transmit the first transmission at 345, the second transmission at 365, or both, based on (e.g., in accordance with) the set of parameters associated with the BWP switching pattern which was indicated at 320 (e.g., indicated via a PDSCH transmission indicating the BWP switching pattern).

At 370, the first device 305-*a* may receive a DCI message from the second device 305-*b*. In some aspects, the DCI message received at 365 may include an indication for the first device 305-*a* to refrain from performing subsequent transmissions according to the BWP switching pattern. In this regard, the DCI message may be said to "deactivate" the BWP switching pattern. In such cases, the first device 305-*a* may be configured to refrain from performing any subsequent transmissions, may perform subsequent transmissions according to a different configuration (e.g., a default BWP switching pattern, a default wireless communications configuration), or any combination thereof. Additionally or alternatively, the DCI message received at 370 may adjust one or more parameters associated with the BWP switching pattern.

At 375, the first device 305-*a* may transmit a third transmission to the one or more devices of the wireless communications network. In some aspects, the first device 305-*a* may transmit the third transmission at 375 based on (e.g., in accordance with) the DCI message received at 370. For example, in cases where the DCI message indicates for the first device 305-*a* to refrain from performing subsequent transmissions according to the BWP switching pattern (e.g., the DCI message deactivates the BWP switching pattern), the first device 305-*a* may transmit the third transmission according to a second configuration which is different from the configuration for the BWP switching pattern. In this example, the second configuration may include a second configuration associated with a second (e.g., default) BWP switching pattern which is different from the original BWP switching pattern. Additionally or alternatively, the third transmission may be performed based on allocations of time/frequency resources received from the second device 305-*c* (e.g., in accordance with dynamic grants). By way of another example, in cases where the DCI message received at 370 modifies one or more parameters associated with the BWP switching pattern, the third transmission may be performed in accordance with the modified parameters indicated via the DCI message.

In additional or alternative cases, the first device 305-*a* may refrain from performing subsequent transmissions (e.g., refrain from performing the third transmission at 375) in cases where the DCI message deactivates the BWP switching pattern. In such cases, the first device 305-*a* may refrain from performing the third transmission (and other transmissions) until the first device 305-*a* receives an additional DCI message which re-activates the BWP switching pattern and/or activates a new BWP switching pattern.

Techniques described herein may enable the first device 305-*a* to be configured with one or more BWP switching patterns, which may be used for wireless communications at the first device 305-*a*. A device 305 may be configured to perform sidelink communications, uplink/downlink communications, or both, in accordance with a configured BWP switching pattern. In the context of sidelink communications, techniques described herein may enable devices 305 to be configured with multiple BWPs within a BWP switching pattern, thereby reducing a quantity of control signaling from the network which is used to configure BWPs for sidelink communications. Accordingly, by enabling devices 305 to be configured with BWP switching patterns including multiple BWPs, techniques described herein may reduce control signaling overhead and improve resource utilization within the wireless communications system.

Figure 4:
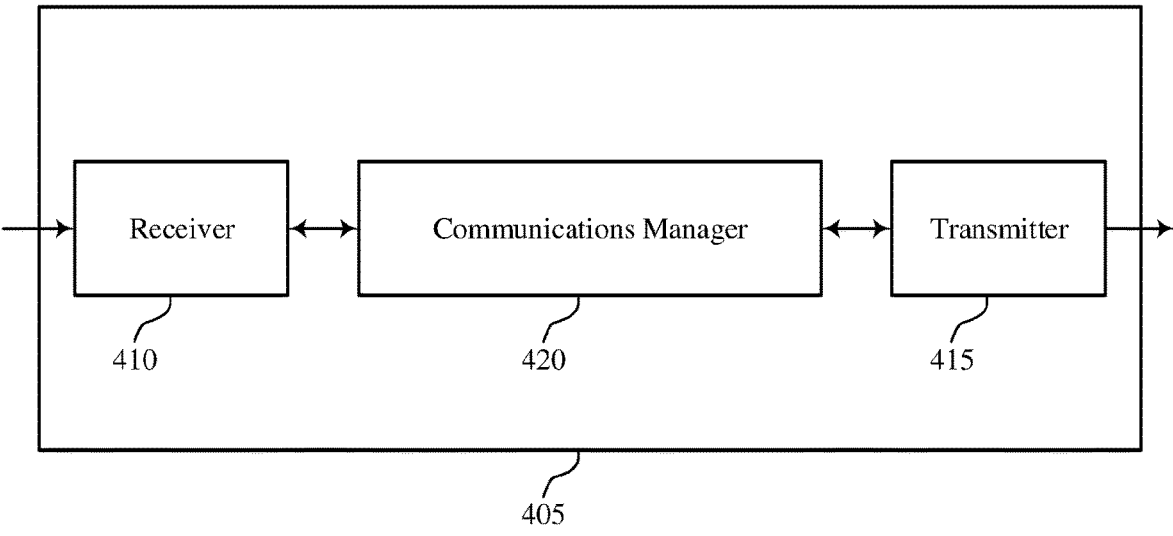
FIGS. 4 and 5 show block diagrams of devices that support techniques for BWP switching patterns in accordance with one or more aspects of the present disclosure.

FIG. 4 shows a block diagram 400 of a device 405 that supports techniques for BWP switching patterns in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for BWP switching patterns). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for BWP switching patterns). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for BWP switching patterns as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first device of a wireless communications network in accordance with examples as disclosed herein. For example, the communications manager 420 may be configured as or otherwise support a means for receiving, from a second device of the wireless communications network, a configuration for a BWP switching pattern for wireless communications performed at the first device, the BWP switching pattern including at least a first BWP and a second BWP different from the first BWP. The communications manager 420 may be configured as or otherwise support a means for transmitting a first transmission to one or more devices of the wireless communications network during a first time interval and in accordance with the first BWP. The communications manager 420 may be configured as or otherwise support a means for transmitting a second transmission to the one or more devices of the wireless communications network during a second time interval different from the first time interval and in accordance with the second BWP.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for configuring the UE 115 with BWP switching patterns which may be used for wireless communications at the UE 115. In the context of sidelink communications, techniques described herein may enable UEs 115 to be configured with multiple BWPs within a BWP switching pattern, thereby reducing a quantity of control signaling from the network which is used to configure BWPs for sidelink communications. Accordingly, by enabling UEs 115 to be configured with BWP switching patterns including multiple BWPs, techniques described herein may reduce control signaling overhead and improve resource utilization within the wireless communications system.

Figure 5:
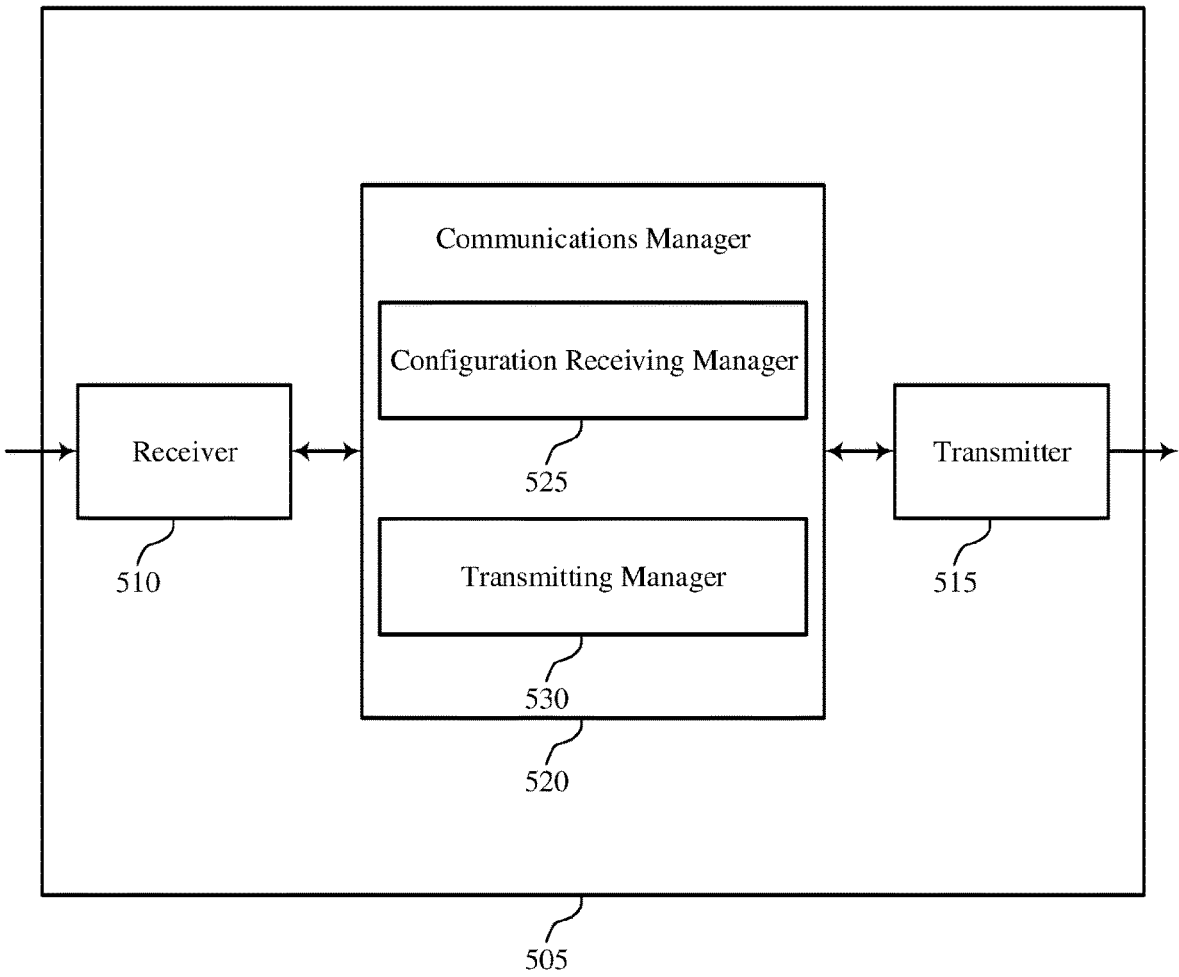

FIG. 5 shows a block diagram 500 of a device 505 that supports techniques for BWP switching patterns in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for BWP switching patterns). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for BWP switching patterns). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for BWP switching patterns as described herein. For example, the communications manager 520 may include a configuration receiving manager 525 a transmitting manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device of a wireless communications network in accordance with examples as disclosed herein. The configuration receiving manager 525 may be configured as or otherwise support a means for receiving, from a second device of the wireless communications network, a configuration for a BWP switching pattern for wireless communications performed at the first device, the BWP switching pattern including at least a first BWP and a second BWP different from the first BWP. The transmitting manager 530 may be configured as or otherwise support a means for transmitting a first transmission to one or more devices of the wireless communications network during a first time interval and in accordance with the first BWP. The transmitting manager 530 may be configured as or otherwise support a means for transmitting a second transmission to the one or more devices of the wireless communications network during a second time interval different from the first time interval and in accordance with the second BWP.

Figure 6:
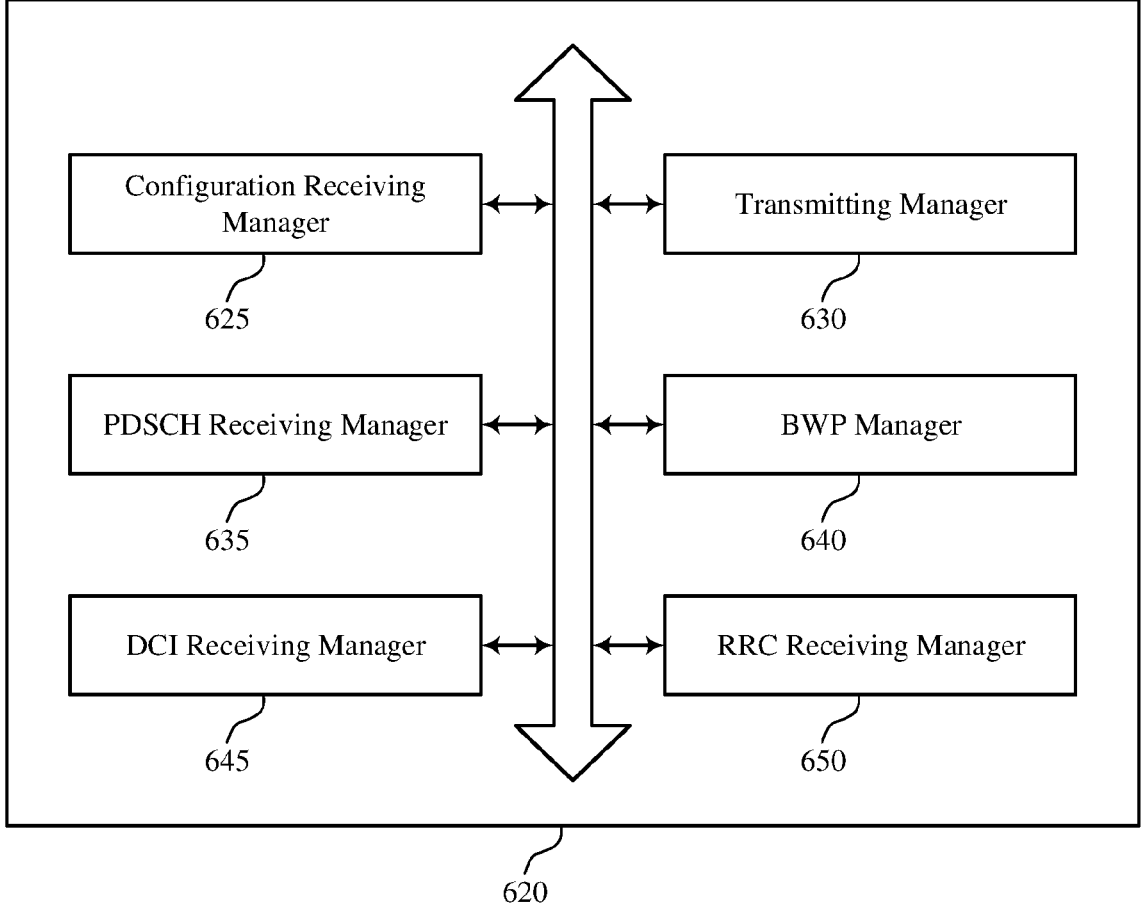
FIG. 6 shows a block diagram of a communications manager that supports techniques for BWP switching patterns in accordance with one or more aspects of the present disclosure.

FIG. 6 shows a block diagram 600 of a communications manager 620 that supports techniques for BWP switching patterns in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for BWP switching patterns as described herein. For example, the communications manager 620 may include a configuration receiving manager 625, a transmitting manager 630, an PDSCH receiving manager 635, a BWP manager 640, a DCI receiving manager 645, an RRC receiving manager 650, or any combination thereof. Each of these components may communicate, directly or indirectly, with one another (e.g., via one or more buses).

The communications manager 620 may support wireless communication at a first device of a wireless communications network in accordance with examples as disclosed herein. The configuration receiving manager 625 may be configured as or otherwise support a means for receiving, from a second device of the wireless communications network, a configuration for a BWP switching pattern for wireless communications performed at the first device, the BWP switching pattern including at least a first BWP and a second BWP different from the first BWP. The transmitting manager 630 may be configured as or otherwise support a means for transmitting a first transmission to one or more devices of the wireless communications network during a first time interval and in accordance with the first BWP. In some examples, the transmitting manager 630 may be configured as or otherwise support a means for transmitting a second transmission to the one or more devices of the wireless communications network during a second time interval different from the first time interval and in accordance with the second BWP.

In some examples, the PDSCH receiving manager 635 may be configured as or otherwise support a means for receiving, from the second device, a PDSCH transmission including the configuration for the BWP switching pattern, where transmitting the first transmission, the second transmission, or both, is based on receiving the PDSCH transmission. In some examples, the PDSCH receiving manager 635 may be configured as or otherwise support a means for receiving, via the PDSCH transmission, a set of parameters associated with the BWP switching pattern, where the first transmission, the second transmission, or both, are transmitted in accordance with the set of parameters. In some examples, the PDSCH transmission includes a RRC message, a MAC-CE message, or both.

In some examples, the DCI receiving manager 645 may be configured as or otherwise support a means for receiving, from the second device, a DCI message including an indication of at least one parameter which is different from the set of parameters, where the first transmission, the second transmission, or both, is transmitted in accordance with the at least one parameter. In some examples, the DCI receiving manager 645 may be configured as or otherwise support a means for receiving, from the second device, a DCI message including an indication for the first device to perform wireless communications according to the BWP switching pattern, where transmitting the first transmission, the second transmission, or both, is based on receiving the DCI message.

In some examples, the DCI receiving manager 645 may be configured as or otherwise support a means for receiving, from the second device, a DCI message including an indication for the first device to refrain from performing subsequent transmissions according to the BWP switching pattern.

In some examples, the transmitting manager 630 may be configured as or otherwise support a means for transmitting, to the second device, a request for the BWP switching pattern, where the PDSCH transmission is received in response to the request. In some examples, the transmitting manager 630 may be configured as or otherwise support a means for transmitting, to the second device via the request, an indication of a first set of parameters associated with BWP switching at the first device, an indication of a second set of parameters associated with the wireless communications network, or both, where the BWP switching pattern is based on the first set of parameters, the second set of parameters, or both.

In some examples, the RRC receiving manager 650 may be configured as or otherwise support a means for receiving, from the second device, a RRC message including an indication of a set of BWP switching patterns, where the BWP switching pattern indicated in the request is included within the set of BWP switching patterns.

In some examples, the transmitting manager 630 may be configured as or otherwise support a means for transmitting an indication of the BWP switching pattern to the third device, where transmitting the first transmission, the second transmission, or both, is based on transmitting the indication of the BWP switching pattern.

In some examples, the transmitting manager 630 may be configured as or otherwise support a means for transmitting, to the third device, an indication of the first BWP of the BWP switching pattern. In some examples, the transmitting manager 630 may be configured as or otherwise support a means for transmitting the first transmission to the third device in accordance with the BWP switching pattern and based on transmitting the indication of the BWP switching pattern. In some examples, the transmitting manager 630 may be configured as or otherwise support a means for transmitting, to the third device, an indication of a BWP switching procedure from the first BWP to the second BWP. In some examples, the transmitting manager 630 may be configured as or otherwise support a means for transmitting the second transmission to the third device based on transmitting the indication of the BWP switching procedure.

In some examples, the BWP manager 640 may be configured as or otherwise support a means for activating the first BWP based at least in a part on the BWP switching pattern, where transmitting the first transmission is based on the activating. In some examples, the BWP manager 640 may be configured as or otherwise support a means for performing a BWP switching procedure from the first BWP to the second BWP to activate the second BWP, where transmitting the second transmission is based on performing the BWP switching procedure.

In some examples, the BWP switching pattern includes a set of multiple BWPs for wireless communications performed during a set of multiple time intervals, where each time interval of the set of multiple time intervals is associated with a BWP of the set of multiple BWPs.

In some examples, the first device includes a first UE. In some examples, the one or more devices of the wireless communications network include at least one of a base station and a second UE.

In some examples, the first device includes a first UE and the one or more devices of the wireless communications network include a second UE. In some examples, the BWP switching pattern is associated with sidelink communications between the first UE and the second UE. In some examples, the first transmission includes a first sidelink transmission from the first UE to the second UE. In some examples, the second transmission includes a second sidelink transmission from the first UE to the second UE.

Figure 7:
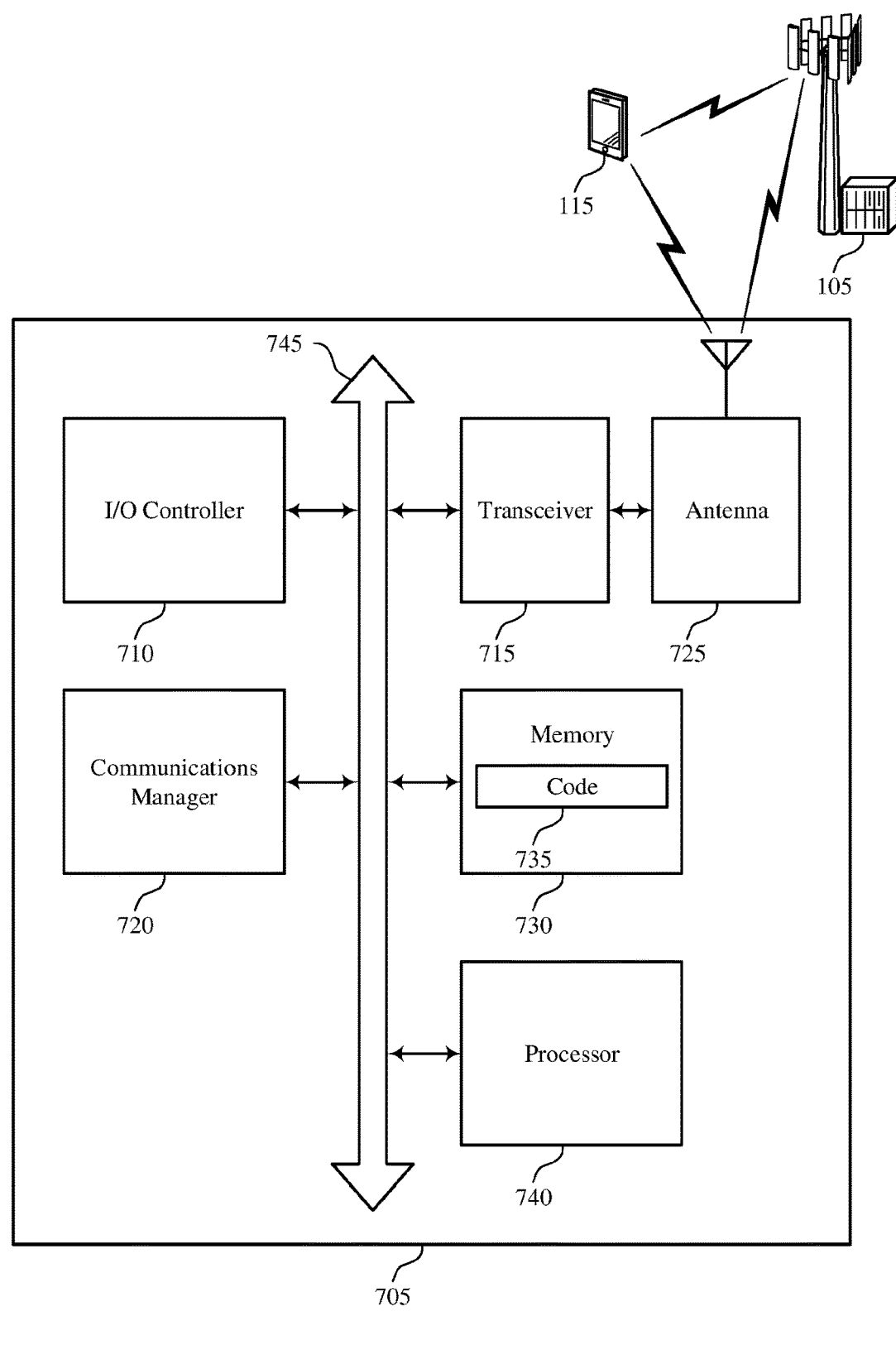
FIG. 7 shows a diagram of a system including a device that supports techniques for BWP switching patterns in accordance with one or more aspects of the present disclosure.

FIG. 7 shows a diagram of a system 700 including a device 705 that supports techniques for BWP switching patterns in accordance with one or more aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for BWP switching patterns). For example, the device 705 or a component of the device 705 may include a processor 740 and memory 730 coupled to the processor 740, the processor 740 and memory 730 configured to perform various functions described herein.

The communications manager 720 may support wireless communication at a first device of a wireless communications network in accordance with examples as disclosed herein. For example, the communications manager 720 may be configured as or otherwise support a means for receiving, from a second device of the wireless communications network, a configuration for a BWP switching pattern for wireless communications performed at the first device, the BWP switching pattern including at least a first BWP and a second BWP different from the first BWP. The communications manager 720 may be configured as or otherwise support a means for transmitting a first transmission to one or more devices of the wireless communications network during a first time interval and in accordance with the first BWP. The communications manager 720 may be configured as or otherwise support a means for transmitting a second transmission to the one or more devices of the wireless communications network during a second time interval different from the first time interval and in accordance with the second BWP.

By including or configuring the communications manager 720 in accordance with examples as described herein, the device 705 may support techniques for configuring UEs 115 with BWP switching patterns which may be used for wireless communications at the UEs 115. In the context of sidelink communications, techniques described herein may enable UEs 115 to be configured with multiple BWPs within a BWP switching pattern, thereby reducing a quantity of control signaling from the network which is used to configure BWPs for sidelink communications. Accordingly, by enabling UEs 115 to be configured with BWP switching patterns including multiple BWPs, techniques described herein may reduce control signaling overhead and improve resource utilization within the wireless communications system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for BWP switching patterns as described herein, or the processor 740 and the memory 730 may be otherwise configured to perform or support such operations.

Figure 8:
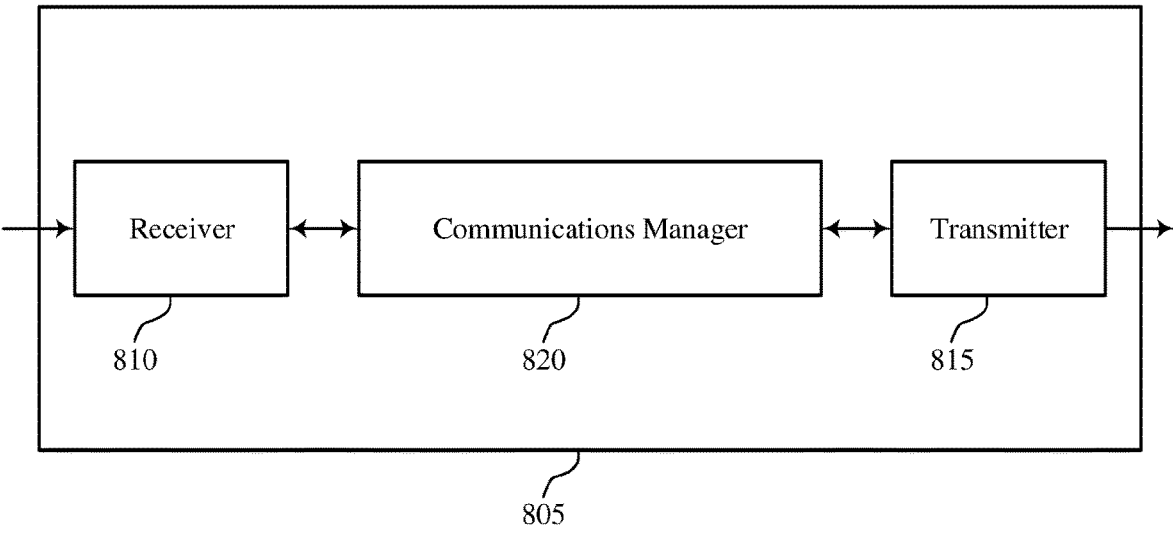
FIGS. 8 and 9 show block diagrams of devices that support techniques for BWP switching patterns in accordance with one or more aspects of the present disclosure.

FIG. 8 shows a block diagram 800 of a device 805 that supports techniques for BWP switching patterns in accordance with one or more aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for BWP switching patterns). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for BWP switching patterns). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for BWP switching patterns as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a second device of a wireless communications network in accordance with examples as disclosed herein. For example, the communications manager 820 may be configured as or otherwise support a means for transmitting, to a first device of the wireless communications network, a configuration for a BWP switching pattern for wireless communications performed at the first device, the BWP switching pattern including at least a first BWP and a second BWP different from the first BWP. The communications manager 820 may be configured as or otherwise support a means for receiving a first transmission from the first device during a first time interval and in accordance with the first BWP. The communications manager 820 may be configured as or otherwise support a means for receiving a second transmission from the first device during a second time interval different from the first time interval and in accordance with the second BWP.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for configuring the UE 115 with BWP switching patterns which may be used for wireless communications at the UE 115. In the context of sidelink communications, techniques described herein may enable UEs 115 to be configured with multiple BWPs within a BWP switching pattern, thereby reducing a quantity of control signaling from the network which is used to configure BWPs for sidelink communications. Accordingly, by enabling UEs 115 to be configured with BWP switching patterns including multiple BWPs, techniques described herein may reduce control signaling overhead and improve resource utilization within the wireless communications system.

Figure 9:
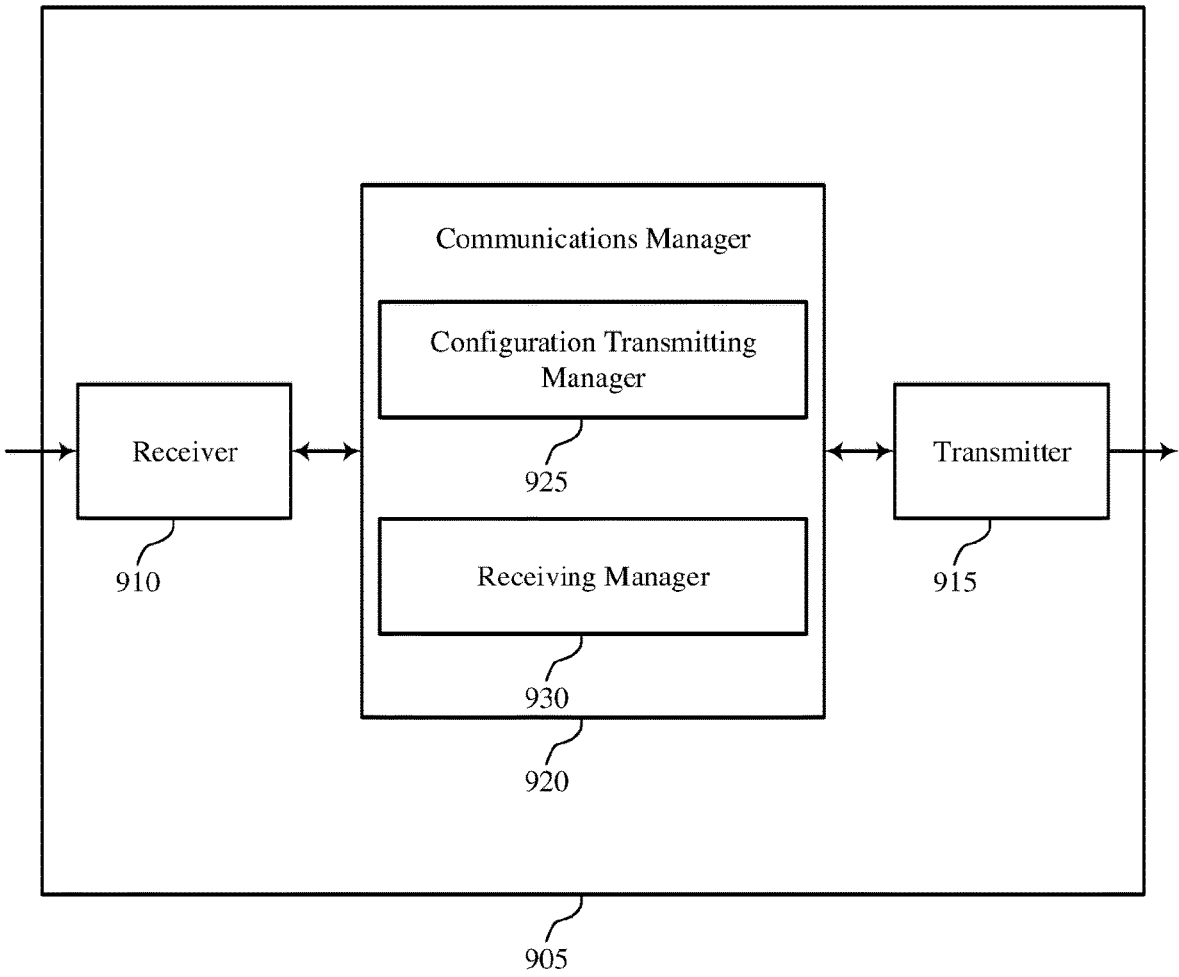

FIG. 9 shows a block diagram 900 of a device 905 that supports techniques for BWP switching patterns in accordance with one or more aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for BWP switching patterns). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for BWP switching patterns). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for BWP switching patterns as described herein. For example, the communications manager 920 may include a configuration transmitting manager 925 a receiving manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second device of a wireless communications network in accordance with examples as disclosed herein. The configuration transmitting manager 925 may be configured as or otherwise support a means for transmitting, to a first device of the wireless communications network, a configuration for a BWP switching pattern for wireless communications performed at the first device, the BWP switching pattern including at least a first BWP and a second BWP different from the first BWP. The receiving manager 930 may be configured as or otherwise support a means for receiving a first transmission from the first device during a first time interval and in accordance with the first BWP. The receiving manager 930 may be configured as or otherwise support a means for receiving a second transmission from the first device during a second time interval different from the first time interval and in accordance with the second BWP.

Figure 10:
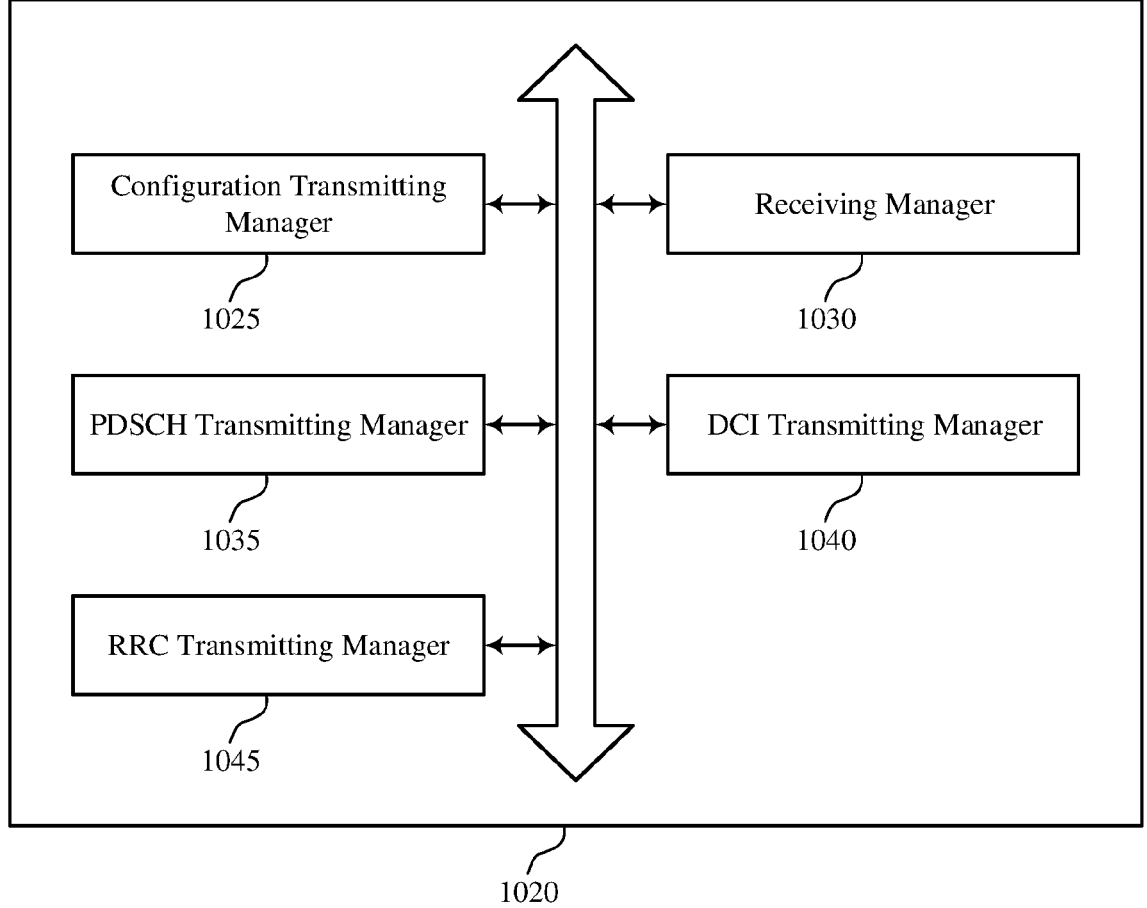
FIG. 10 shows a block diagram of a communications manager that supports techniques for BWP switching patterns in accordance with one or more aspects of the present disclosure.

FIG. 10 shows a block diagram 1000 of a communications manager 1020 that supports techniques for BWP switching patterns in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for BWP switching patterns as described herein. For example, the communications manager 1020 may include a configuration transmitting manager 1025, a receiving manager 1030, an PDSCH transmitting manager 1035, a DCI transmitting manager 1040, an RRC transmitting manager 1045, or any combination thereof. Each of these components may communicate, directly or indirectly, with one another (e.g., via one or more buses).

The communications manager 1020 may support wireless communication at a second device of a wireless communications network in accordance with examples as disclosed herein. The configuration transmitting manager 1025 may be configured as or otherwise support a means for transmitting, to a first device of the wireless communications network, a configuration for a BWP switching pattern for wireless communications performed at the first device, the BWP switching pattern including at least a first BWP and a second BWP different from the first BWP. The receiving manager 1030 may be configured as or otherwise support a means for receiving a first transmission from the first device during a first time interval and in accordance with the first BWP. In some examples, the receiving manager 1030 may be configured as or otherwise support a means for receiving a second transmission from the first device during a second time interval different from the first time interval and in accordance with the second BWP.

In some examples, the PDSCH transmitting manager 1035 may be configured as or otherwise support a means for transmitting, to the first device, a PDSCH transmission including the configuration for the BWP switching pattern, where receiving the first transmission, the second transmission, or both, is based on transmitting the PDSCH transmission. In some examples, the PDSCH transmitting manager 1035 may be configured as or otherwise support a means for transmitting, via the PDSCH transmission, a set of parameters associated with the BWP switching pattern, where the first transmission, the second transmission, or both, are received in accordance with the set of parameters. In some examples, the PDSCH transmission includes a RRC message, a MAC-CE message, or both.

In some examples, the DCI transmitting manager 1040 may be configured as or otherwise support a means for transmitting, to the first device, a DCI message including an indication of at least one parameter which is different from the set of parameters, where the first transmission, the second transmission, or both, is received in accordance with the at least one parameter. In some examples, the DCI transmitting manager 1040 may be configured as or otherwise support a means for transmitting, to the first device, a DCI message including an indication for the first device to perform wireless communications according to the BWP switching pattern, where receiving the first transmission, the second transmission, or both, is based on transmitting the DCI message. In some examples, the DCI transmitting manager 1040 may be configured as or otherwise support a means for transmitting, to the first device, a DCI message including an indication for the first device to refrain from performing subsequent transmissions according to the BWP switching pattern.

In some examples, the receiving manager 1030 may be configured as or otherwise support a means for receiving, from the first device, a request for the BWP switching pattern, where the PDSCH transmission is transmitted in response to the request. In some examples, the receiving manager 1030 may be configured as or otherwise support a means for receiving, from the first device via the request, an indication of a first set of parameters associated with BWP switching at the first device, an indication of a second set of parameters associated with the wireless communications network, or both, where the BWP switching pattern is based on the first set of parameters, the second set of parameters, or both.

In some examples, the RRC transmitting manager 1045 may be configured as or otherwise support a means for transmitting, to the first device, a RRC message including an indication of a set of BWP switching patterns, where the BWP switching pattern indicated in the request is included within the set of BWP switching patterns.

In some examples, the BWP switching pattern includes a set of multiple BWPs for wireless communications performed during a set of multiple time intervals, where each time interval of the set of multiple time intervals is associated with a BWP of the set of multiple BWPs.

In some examples, the first device includes a first UE and the second device includes a base station.

Figure 11:
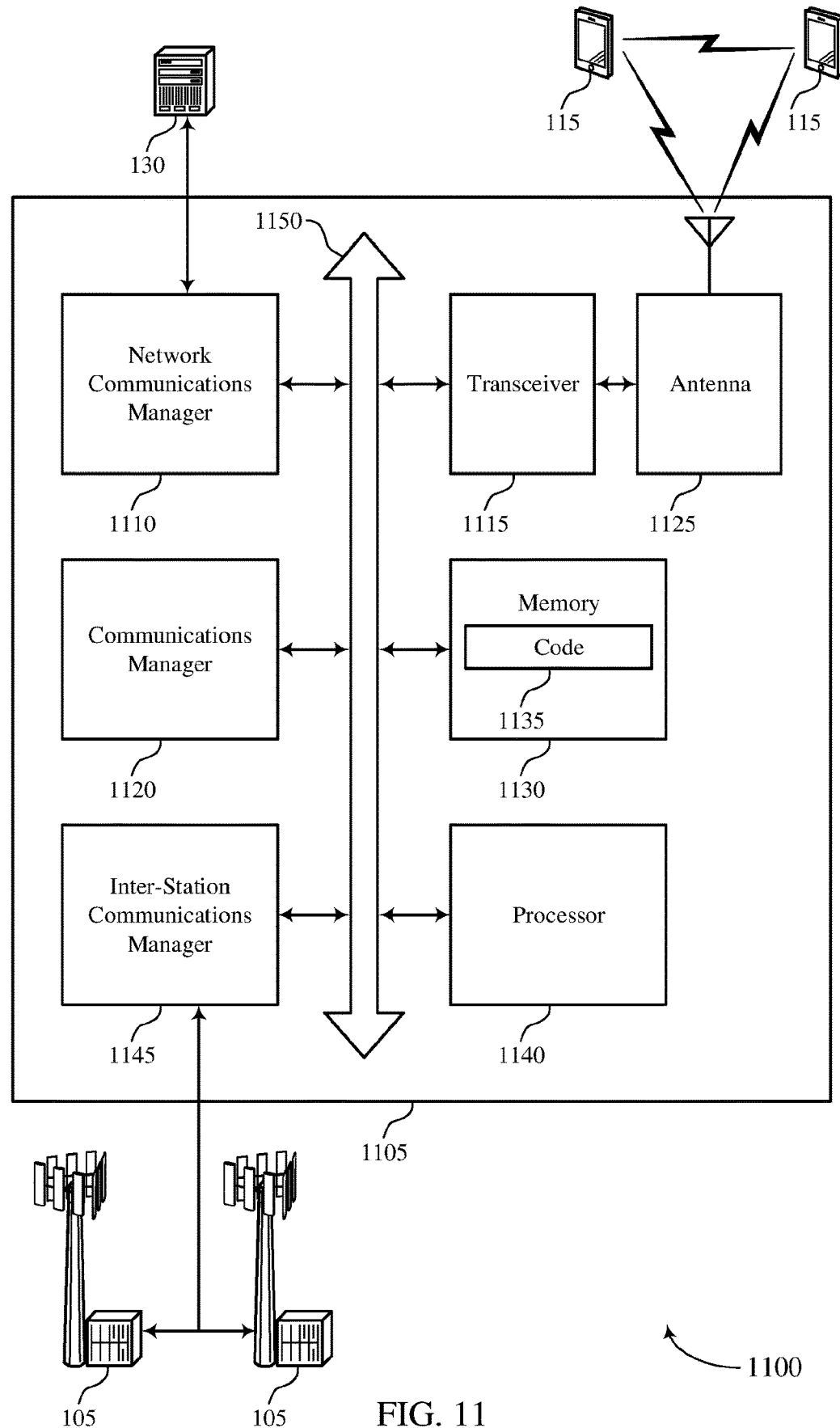
FIG. 11 shows a diagram of a system including a device that supports techniques for BWP switching patterns in accordance with one or more aspects of the present disclosure.

FIG. 11 shows a diagram of a system 1100 including a device 1105 that supports techniques for BWP switching patterns in accordance with one or more aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for BWP switching patterns). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a second device of a wireless communications network in accordance with examples as disclosed herein. For example, the communications manager 1120 may be configured as or otherwise support a means for transmitting, to a first device of the wireless communications network, a configuration for a BWP switching pattern for wireless communications performed at the first device, the BWP switching pattern including at least a first BWP and a second BWP different from the first BWP. The communications manager 1120 may be configured as or otherwise support a means for receiving a first transmission from the first device during a first time interval and in accordance with the first BWP. The communications manager 1120 may be configured as or otherwise support a means for receiving a second transmission from the first device during a second time interval different from the first time interval and in accordance with the second BWP.

By including or configuring the communications manager 1120 in accordance with examples as described herein, the device 1105 may support techniques for configuring the UE 115 with BWP switching patterns which may be used for wireless communications at the UE 115. In the context of sidelink communications, techniques described herein may enable UEs 115 to be configured with multiple BWPs within a BWP switching pattern, thereby reducing a quantity of control signaling from the network which is used to configure BWPs for sidelink communications. Accordingly, by enabling UEs 115 to be configured with BWP switching patterns including multiple BWPs, techniques described herein may reduce control signaling overhead and improve resource utilization within the wireless communications system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for BWP switching patterns as described herein, or the processor 1140 and the memory 1130 may be otherwise configured to perform or support such operations.

Figure 12:
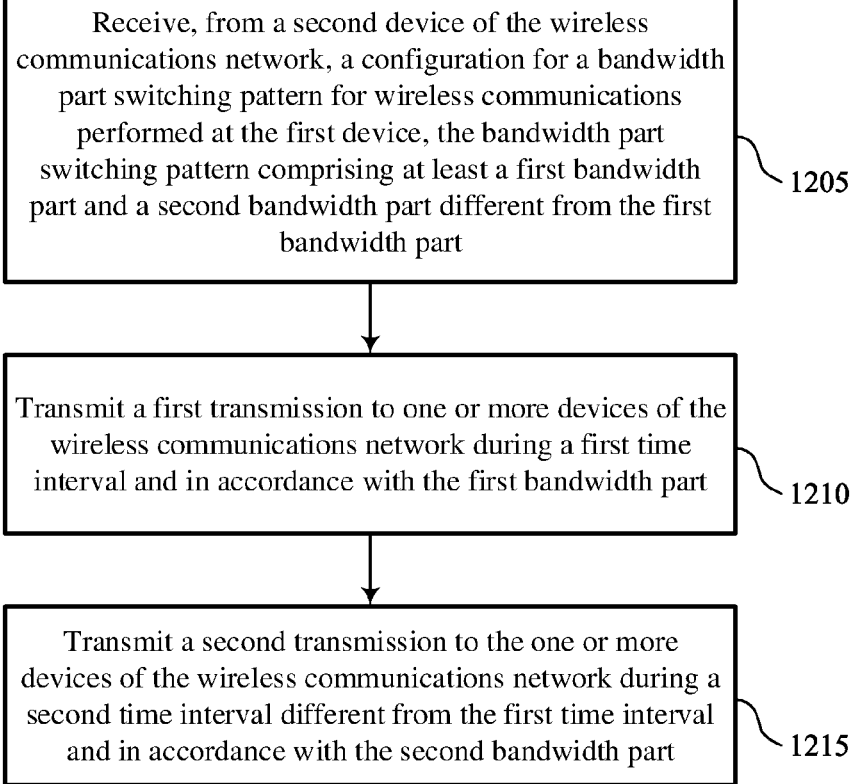

FIG. 12 shows a flowchart illustrating a method 1200 that supports techniques for BWP switching patterns in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a second device of the wireless communications network, a configuration for a BWP switching pattern for wireless communications performed at the first device, the BWP switching pattern including at least a first BWP and a second BWP different from the first BWP. The operations of 1205 may be performed in accordance with examples as disclosed herein. In some examples, aspects of the operations of 1205 may be performed by a configuration receiving manager 625 as described with reference to FIG. 6.

At 1210, the method may include transmitting a first transmission to one or more devices of the wireless communications network during a first time interval and in accordance with the first BWP. The operations of 1210 may be performed in accordance with examples as disclosed herein. In some examples, aspects of the operations of 1210 may be performed by a transmitting manager 630 as described with reference to FIG. 6.

At 1215, the method may include transmitting a second transmission to the one or more devices of the wireless communications network during a second time interval different from the first time interval and in accordance with the second BWP. The operations of 1215 may be performed in accordance with examples as disclosed herein. In some examples, aspects of the operations of 1215 may be performed by a transmitting manager 630 as described with reference to FIG. 6.

FIG. 13 shows a flowchart illustrating a method 1300 that supports techniques for BWP switching patterns in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a second device, a PDSCH transmission including a configuration for a BWP switching pattern for wireless communications performed at the first device, the BWP switching pattern including at least a first BWP and a second BWP different from the first BWP. The operations of 1305 may be performed in accordance with examples as disclosed herein. In some examples, aspects of the operations of 1305 may be performed by an PDSCH receiving manager 635 as described with reference to FIG. 6.

At 1310, the method may include receiving, via the PDSCH transmission, a set of parameters associated with the BWP switching pattern. The operations of 1310 may be performed in accordance with examples as disclosed herein. In some examples, aspects of the operations of 1310 may be performed by an PDSCH receiving manager 635 as described with reference to FIG. 6.

At 1315, the method may include transmitting a first transmission to one or more devices of the wireless communications network during a first time interval and in accordance with the first BWP, where the first transmission is transmitted in accordance with the set of parameters. The operations of 1315 may be performed in accordance with examples as disclosed herein. In some examples, aspects of the operations of 1315 may be performed by a transmitting manager 630 as described with reference to FIG. 6.

At 1320, the method may include transmitting a second transmission to the one or more devices of the wireless communications network during a second time interval different from the first time interval and in accordance with the second BWP, where the second transmission is transmitted in accordance with the set of parameters. The operations of 1325 may be performed in accordance with examples as disclosed herein. In some examples, aspects of the operations of 1320 may be performed by a transmitting manager 630 as described with reference to FIG. 6.

Figure 14:
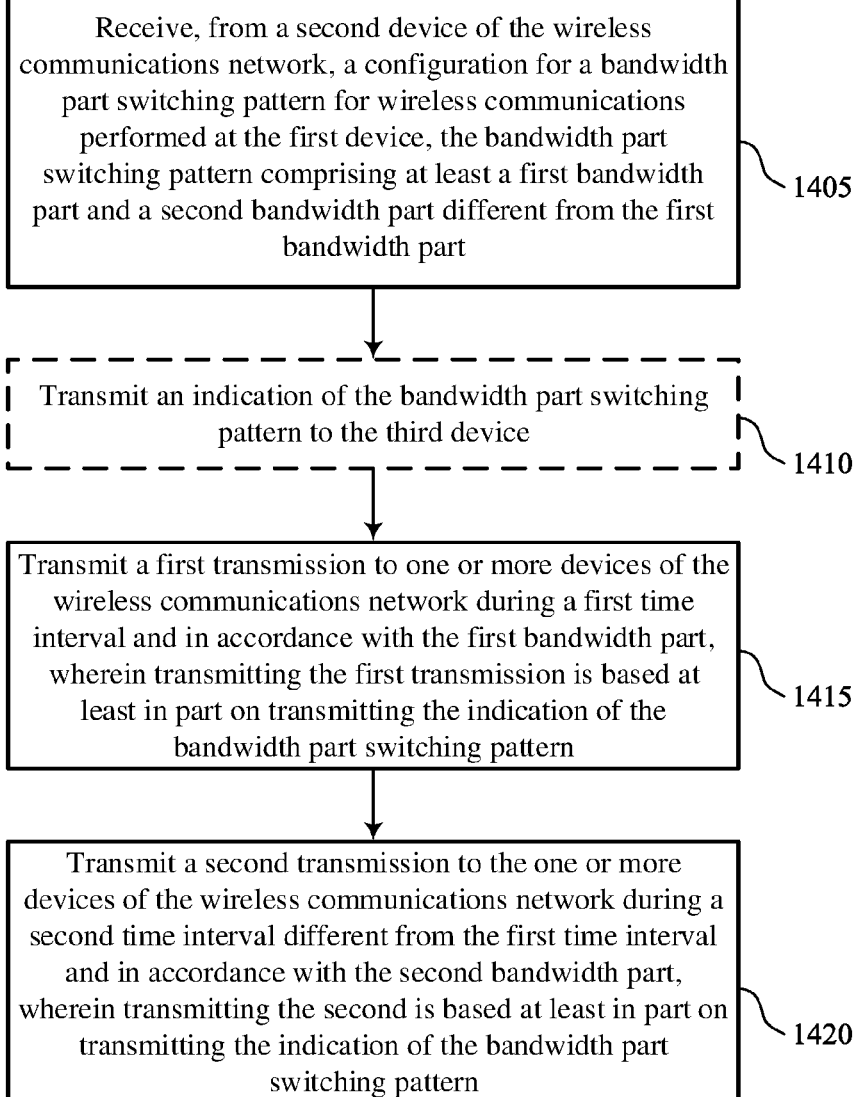

FIG. 14 shows a flowchart illustrating a method 1400 that supports techniques for BWP switching patterns in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a second device of the wireless communications network, a configuration for a BWP switching pattern for wireless communications performed at the first device, the BWP switching pattern including at least a first BWP and a second BWP different from the first BWP. The operations of 1405 may be performed in accordance with examples as disclosed herein. In some examples, aspects of the operations of 1405 may be performed by a configuration receiving manager 625 as described with reference to FIG. 6.

At 1410, the method may include transmitting an indication of the BWP switching pattern to the third device. The operations of 1410 may be performed in accordance with examples as disclosed herein. In some examples, aspects of the operations of 1410 may be performed by a transmitting manager 630 as described with reference to FIG. 6.

At 1415, the method may include transmitting a first transmission to one or more devices of the wireless communications network during a first time interval and in accordance with the first BWP, where transmitting the first transmission is based on transmitting the indication of the BWP switching pattern. The operations of 1415 may be performed in accordance with examples as disclosed herein. In some examples, aspects of the operations of 1415 may be performed by a transmitting manager 630 as described with reference to FIG. 6.

At 1420, the method may include transmitting a second transmission to the one or more devices of the wireless communications network during a second time interval different from the first time interval and in accordance with the second BWP, where transmitting the second transmission is based on transmitting the indication of the BWP switching pattern. The operations of 1420 may be performed in accordance with examples as disclosed herein. In some examples, aspects of the operations of 1420 may be performed by a transmitting manager 630 as described with reference to FIG. 6.

FIG. 15 shows a flowchart illustrating a method 1500 that supports techniques for BWP switching patterns in accordance with one or more aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a first device of the wireless communications network, a configuration for a BWP switching pattern for wireless communications performed at the first device, the BWP switching pattern including at least a first BWP and a second BWP different from the first BWP. The operations of 1505 may be performed in accordance with examples as disclosed herein. In some examples, aspects of the operations of 1505 may be performed by a configuration transmitting manager 1025 as described with reference to FIG. 10.

At 1510, the method may include receiving a first transmission from the first device during a first time interval and in accordance with the first BWP. The operations of 1510 may be performed in accordance with examples as disclosed herein. In some examples, aspects of the operations of 1510 may be performed by a receiving manager 1030 as described with reference to FIG. 10.

At 1515, the method may include receiving a second transmission from the first device during a second time interval different from the first time interval and in accordance with the second BWP. The operations of 1515 may be performed in accordance with examples as disclosed herein. In some examples, aspects of the operations of 1515 may be performed by a receiving manager 1030 as described with reference to FIG. 10.

The following provides an overview of aspects of the present disclosure:

Aspect 1: A method for wireless communication at a first device of a wireless communications network, comprising: receiving, from a second device of the wireless communications network, a configuration for a BWP switching pattern for wireless communications performed at the first device, the BWP switching pattern comprising at least a first BWP and a second BWP different from the first BWP; transmitting a first transmission to one or more devices of the wireless communications network during a first time interval and in accordance with the first BWP; and transmitting a second transmission to the one or more devices of the wireless communications network during a second time interval different from the first time interval and in accordance with the second BWP.

Aspect 2: The method of aspect 1, further comprising: receiving, from the second device, a PDSCH transmission comprising the configuration for the BWP switching pattern, wherein transmitting the first transmission, the second transmission, or both, is based at least in part on receiving the PDSCH transmission.

Aspect 3: The method of aspect 2, further comprising: receiving, via the PDSCH transmission, a set of parameters associated with the BWP switching pattern, wherein the first transmission, the second transmission, or both, are transmitted in accordance with the set of parameters.

Aspect 4: The method of aspect 3, the set of parameters comprising at least one of periodicity of the BWP switching pattern, a sequence of BWPs within the BWP switching pattern, an indication of a starting time for the BWP switching pattern, a set of time intervals associated with a set of BWPs of the BWP switching pattern, or any combination thereof.

Aspect 5: The method of any of aspects 3 through 4, further comprising: receiving, from the second device, a DCI message comprising an indication of at least one parameter which is different from the set of parameters, wherein the first transmission, the second transmission, or both, is transmitted in accordance with the at least one parameter.

Aspect 6: The method of any of aspects 2 through 5, further comprising: receiving, from the second device, a DCI message comprising an indication for the first device to perform wireless communications according to the BWP switching pattern, wherein transmitting the first transmission, the second transmission, or both, is based at least in part on receiving the DCI message.

Aspect 7: The method of any of aspects 2 through 6, further comprising: receiving, from the second device, a DCI message comprising an indication for the first device to refrain from performing subsequent transmissions according to the BWP switching pattern.

Aspect 8: The method of any of aspects 2 through 7, wherein the PDSCH transmission comprises a RRC message, a MAC-CE message, or both.

Aspect 9: The method of any of aspects 2 through 8, further comprising: transmitting, to the second device, a request for the BWP switching pattern, wherein the PDSCH transmission is received in response to the request.

Aspect 10: The method of aspect 9, further comprising: transmitting, to the second device via the request, an indication of a first set of parameters associated with BWP switching at the first device, an indication of a second set of parameters associated with the wireless communications network, or both, wherein the BWP switching pattern is based at least in part on the first set of parameters, the second set of parameters, or both.

Aspect 11: The method of any of aspects 9 through 10, further comprising: receiving, from the second device, a RRC message comprising an indication of a set of BWP switching patterns, wherein the BWP switching pattern indicated in the request is included within the set of BWP switching patterns.

Aspect 12: The method of any of aspects 1 through 11, the one or more devices of the wireless communications network comprising a third device, the method further comprising: transmitting an indication of the BWP switching pattern to the third device, wherein transmitting the first transmission, the second transmission, or both, is based at least in part on transmitting the indication of the BWP switching pattern.

Aspect 13: The method of any of aspects 1 through 12, the one or more devices of the wireless communications network comprising a third device, the method further comprising: transmitting, to the third device, an indication of the first BWP of the BWP switching pattern; transmitting the first transmission to the third device in accordance with the BWP switching pattern and based at least in part on transmitting the indication of the BWP switching pattern; transmitting, to the third device, an indication of a BWP switching procedure from the first BWP to the second BWP; and transmitting the second transmission to the third device based at least in part on transmitting the indication of the BWP switching procedure.

Aspect 14: The method of any of aspects 1 through 13, further comprising: activating the first BWP based at least in a part on the BWP switching pattern, wherein transmitting the first transmission is based at least in part on the activating; and performing a BWP switching procedure from the first BWP to the second BWP to activate the second BWP, wherein transmitting the second transmission is based at least in part on performing the BWP switching procedure.

Aspect 15: The method of any of aspects 1 through 14, wherein the BWP switching pattern comprises a plurality of BWPs for wireless communications performed during a plurality of time intervals, where each time interval of the plurality of time intervals is associated with a BWP of the plurality of BWPs.

Aspect 16: The method of any of aspects 1 through 15, wherein the first device comprises a first UE, and the one or more devices of the wireless communications network comprise at least one of a base station and a second UE.

Aspect 17: The method of any of aspects 1 through 16, wherein the first device comprises a first UE and the one or more devices of the wireless communications network comprise a second UE, the BWP switching pattern is associated with sidelink communications between the first UE and the second UE, the first transmission comprises a first sidelink transmission from the first UE to the second UE, and the second transmission comprises a second sidelink transmission from the first UE to the second UE.

Aspect 18: A method for wireless communication at a second device of a wireless communications network, comprising: transmitting, to a first device of the wireless communications network, a configuration for a BWP switching pattern for wireless communications performed at the first device, the BWP switching pattern comprising at least a first BWP and a second BWP different from the first BWP; receiving a first transmission from the first device during a first time interval and in accordance with the first BWP; and receiving a second transmission from the first device during a second time interval different from the first time interval and in accordance with the second BWP.

Aspect 19: The method of aspect 18, further comprising: transmitting, to the first device, a PDSCH transmission comprising the configuration for the BWP switching pattern, wherein receiving the first transmission, the second transmission, or both, is based at least in part on transmitting the PDSCH transmission.

Aspect 20: The method of aspect 19, further comprising: transmitting, via the PDSCH transmission, a set of parameters associated with the BWP switching pattern, wherein the first transmission, the second transmission, or both, are received in accordance with the set of parameters.

Aspect 21: The method of aspect 20, the set of parameters comprising at least one of a periodicity of the BWP switching pattern, a sequence of BWPs within the BWP switching pattern, an indication of a starting time for the BWP switching pattern, a set of time intervals associated with a set of BWPs of the BWP switching pattern, or any combination thereof.

Aspect 22: The method of any of aspects 20 through 21, further comprising: transmitting, to the first device, a DCI message comprising an indication of at least one parameter which is different from the set of parameters, wherein the first transmission, the second transmission, or both, is received in accordance with the at least one parameter.

Aspect 23: The method of any of aspects 19 through 22, further comprising: transmitting, to the first device, a DCI message comprising an indication for the first device to perform wireless communications according to the BWP switching pattern, wherein receiving the first transmission, the second transmission, or both, is based at least in part on transmitting the DCI message.

Aspect 24: The method of any of aspects 19 through 23, further comprising: transmitting, to the first device, a DCI message comprising an indication for the first device to refrain from performing subsequent transmissions according to the BWP switching pattern.

Aspect 25: The method of any of aspects 19 through 24, wherein the PDSCH transmission comprises a RRC message, a MAC-CE message, or both.

Aspect 26: The method of any of aspects 19 through 25, further comprising: receiving, from the first device, a request for the BWP switching pattern, wherein the PDSCH transmission is transmitted in response to the request.

Aspect 27: The method of aspect 26, further comprising: receiving, from the first device via the request, an indication of a first set of parameters associated with BWP switching at the first device, an indication of a second set of parameters associated with the wireless communications network, or both, wherein the BWP switching pattern is based at least in part on the first set of parameters, the second set of parameters, or both.

Aspect 28: The method of any of aspects 26 through 27, further comprising: transmitting, to the first device, a RRC message comprising an indication of a set of BWP switching patterns, wherein the BWP switching pattern indicated in the request is included within the set of BWP switching patterns.

Aspect 29: The method of any of aspects 18 through 28, wherein the BWP switching pattern comprises a plurality of BWPs for wireless communications performed during a plurality of time intervals, where each time interval of the plurality of time intervals is associated with a BWP of the plurality of BWPs.

Aspect 30: The method of any of aspects 18 through 29, wherein the first device comprises a first UE and the second device comprises a base station.

Aspect 31: An apparatus for wireless communication at a first device of a wireless communications network, comprising a processor; memory coupled with the processor; and instructions stored in the memory and executable by the processor to cause the apparatus to perform a method of any of aspects 1 through 17.

Aspect 32: An apparatus for wireless communication at a first device of a wireless communications network, comprising at least one means for performing a method of any of aspects 1 through 17.

Aspect 33: A non-transitory computer-readable medium storing code for wireless communication at a first device of a wireless communications network, the code comprising instructions executable by a processor to perform a method of any of aspects 1 through 17.

Aspect 34: An apparatus for wireless communication at a second device of a wireless communications network, comprising a processor; memory coupled with the processor; and instructions stored in the memory and executable by the processor to cause the apparatus to perform a method of any of aspects 18 through 30.

Aspect 35: An apparatus for wireless communication at a second device of a wireless communications network, comprising at least one means for performing a method of any of aspects 18 through 30.

Aspect 36: A non-transitory computer-readable medium storing code for wireless communication at a second device of a wireless communications network, the code comprising instructions executable by a processor to perform a method of any of aspects 18 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device of a wireless communications network, comprising:

receiving, from a second device of the wireless communications network, a configuration for a bandwidth part switching pattern for wireless communications performed at the first device, the bandwidth part switching pattern comprising at least a first bandwidth part and a second bandwidth part different from the first bandwidth part;

transmitting, to a third device, an indication of the first bandwidth part of the bandwidth part switching pattern;

transmitting a first transmission to one or more devices including the third device during a first time interval in accordance with the first bandwidth part and based at least in part on the bandwidth part switching pattern;

transmitting, to the third device, an indication of a bandwidth part switching procedure from the first bandwidth part to the second bandwidth part; and transmitting a second transmission to the one or more devices including the third device during a second time interval different from the first time interval in accordance with the second bandwidth part and based at least in part on the indication of the bandwidth part switching procedure.

2. The method of claim 1, further comprising:

receiving, from the second device, a physical downlink shared channel transmission comprising the configuration for the bandwidth part switching pattern, wherein transmitting the first transmission, the second transmission, or both, is based at least in part on receiving the physical downlink shared channel transmission.

3. The method of claim 2, further comprising:

receiving, via the physical downlink shared channel transmission, a set of parameters associated with the bandwidth part switching pattern, wherein the first transmission, the second transmission, or both, are transmitted in accordance with the set of parameters.

4. The method of claim 3, the set of parameters comprising at least one of periodicity of the bandwidth part switching pattern, a sequence of bandwidth parts within the bandwidth part switching pattern, an indication of a starting time for the bandwidth part switching pattern, a set of time intervals associated with a set of bandwidth parts of the bandwidth part switching pattern, or any combination thereof.

5. The method of claim 3, further comprising:

receiving, from the second device, a downlink control information message comprising an indication of at least one parameter which is different from the set of parameters, wherein the first transmission, the second transmission, or both, is transmitted in accordance with the at least one parameter.

6. The method of claim 2, further comprising:

receiving, from the second device, a downlink control information message comprising an indication for the first device to perform wireless communications according to the bandwidth part switching pattern, wherein transmitting the first transmission, the second transmission, or both, is based at least in part on receiving the downlink control information message.

7. The method of claim 2, further comprising:

receiving, from the second device, a downlink control information message comprising an indication for the first device to refrain from performing subsequent transmissions according to the bandwidth part switching pattern.

8. The method of claim 2, wherein the physical downlink shared channel transmission comprises a radio resource control message, a MAC-CE message, or both.

9. The method of claim 2, further comprising:

transmitting, to the second device, a request for the bandwidth part switching pattern, wherein the physical downlink shared channel transmission is received in response to the request.

10. The method of claim 9, further comprising:

transmitting, to the second device via the request, an indication of a first set of parameters associated with bandwidth part switching at the first device, an indication of a second set of parameters associated with the wireless communications network, or both, wherein the bandwidth part switching pattern is based at least in part on the first set of parameters, the second set of parameters, or both.

11. The method of claim 1, further comprising:

activating the first bandwidth part based at least in a part on the bandwidth part switching pattern, wherein transmitting the first transmission is based at least in part on the activating; and performing the bandwidth part switching procedure from the first bandwidth part to the second bandwidth part to activate the second bandwidth part, wherein transmitting the second transmission is based at least in part on performing the bandwidth part switching procedure.

12. The method of claim 1, wherein the bandwidth part switching pattern comprises a plurality of bandwidth parts for wireless communications performed during a plurality of time intervals, where each time interval of the plurality of time intervals is associated with a bandwidth part of the plurality of bandwidth parts.

13. The method of claim 1, wherein the first device comprises a first user equipment (UE), and wherein the one or more devices of the wireless communications network comprise at least one of a network entity or a second UE.

14. The method of claim 1, wherein the first device comprises a first user equipment (UE) and the one or more devices of the wireless communications network comprise a second UE, wherein the bandwidth part switching pattern is associated with sidelink communications between the first UE and the second UE, wherein the first transmission comprises a first sidelink transmission from the first UE to the second UE, and wherein the second transmission comprises a second sidelink transmission from the first UE to the second UE.

15. A method for wireless communication at a second device of a wireless communications network, comprising:

transmitting, to a first device of the wireless communications network, a configuration for a bandwidth part switching pattern for wireless communications performed at the first device, the bandwidth part switching pattern comprising at least a first bandwidth part and a second bandwidth part different from the first bandwidth part;

receiving a first transmission from the first device during a first time interval and in accordance with the first bandwidth part and based at least in part on the bandwidth part switching pattern;

receiving an indication of a bandwidth part switching procedure from the first bandwidth part to the second bandwidth part; and receiving a second transmission from the first device during a second time interval different from the first time interval in accordance with the second bandwidth part and based at least in part on the indication of the bandwidth part switching procedure.

16. The method of claim 15, further comprising:

transmitting, to the first device, a physical downlink shared channel transmission comprising the configuration for the bandwidth part switching pattern, wherein receiving the first transmission, the second transmission, or both, is based at least in part on transmitting the physical downlink shared channel transmission.

17. The method of claim 16, further comprising:

transmitting, via the physical downlink shared channel transmission, a set of parameters associated with the bandwidth part switching pattern, wherein the first transmission, the second transmission, or both, are received in accordance with the set of parameters.

18. The method of claim 17, the set of parameters comprising at least one of a periodicity of the bandwidth part switching pattern, a sequence of bandwidth parts within the bandwidth part switching pattern, an indication of a starting time for the bandwidth part switching pattern, a set of time intervals associated with a set of bandwidth parts of the bandwidth part switching pattern, or any combination thereof.

19. The method of claim 17, further comprising:

transmitting, to the first device, a downlink control information message comprising an indication of at least one parameter which is different from the set of parameters, wherein the first transmission, the second transmission, or both, is received in accordance with the at least one parameter.

20. The method of claim 16, further comprising:

transmitting, to the first device, a downlink control information message comprising an indication for the first device to perform wireless communications according to the bandwidth part switching pattern, wherein receiving the first transmission, the second transmission, or both, is based at least in part on transmitting the downlink control information message.

21. The method of claim 16, further comprising:

transmitting, to the first device, a downlink control information message comprising an indication for the first device to refrain from performing subsequent transmissions according to the bandwidth part switching pattern.

22. The method of claim 16, wherein the physical downlink shared channel transmission comprises a radio resource control message, a MAC-CE message, or both.

23. The method of claim 16, further comprising:

receiving, from the first device, a request for the bandwidth part switching pattern, wherein the physical downlink shared channel transmission is transmitted in response to the request.

24. The method of claim 23, further comprising:

receiving, from the first device via the request, an indication of a first set of parameters associated with bandwidth part switching at the first device, an indication of a second set of parameters associated with the wireless communications network, or both, wherein the bandwidth part switching pattern is based at least in part on the first set of parameters, the second set of parameters, or both.

25. The method of claim 15, wherein the bandwidth part switching pattern comprises a plurality of bandwidth parts for wireless communications performed during a plurality of time intervals, where each time interval of the plurality of time intervals is associated with a bandwidth part of the plurality of bandwidth parts.

26. The method of claim 15, wherein the first device comprises a first user equipment (UE) and the second device comprises a base station network entity.

27. An apparatus for wireless communication at a first device of a wireless communications network, comprising:

one or more memories; and one or more processors coupled with the one or more memories and configured to cause the first device to:

receive, from a second device of the wireless communications network, a configuration for a bandwidth part switching pattern for wireless communications performed at the first device, the bandwidth part switching pattern comprising at least a first bandwidth part and a second bandwidth part different from the first bandwidth part;

transmit, to a third device, an indication of the first bandwidth part of the bandwidth part switching pattern;

transmit a first transmission to one or more devices that include the third device during a first time interval in accordance with the first bandwidth part and based at least in part on the bandwidth part switching pattern;

transmit, to the third device, an indication of a bandwidth part switching procedure from the first bandwidth part to the second bandwidth part; and transmit a second transmission to the one or more devices that include the third device during a second time interval different from the first time interval in accordance with the second bandwidth part and based at least in part on the indication of the bandwidth part switching procedure.

28. The apparatus of claim 27, wherein the one or more processors are further configured to cause the first device to:

receive, from the second device, a physical downlink shared channel transmission that comprises the configuration for the bandwidth part switching pattern, wherein the first transmission, the second transmission, or both, are transmitted based at least in part on reception of the physical downlink shared channel transmission.

29. The apparatus of claim 28, wherein the one or more processors are further configured to cause the first device to:

receive, via the physical downlink shared channel transmission, a set of parameters associated with the bandwidth part switching pattern, wherein the first transmission, the second transmission, or both, are transmitted in accordance with the set of parameters.

30. The apparatus of claim 29, the set of parameters comprising at least one of periodicity of the bandwidth part switching pattern, a sequence of bandwidth parts within the bandwidth part switching pattern, an indication of a starting time for the bandwidth part switching pattern, a set of time intervals associated with a set of bandwidth parts of the bandwidth part switching pattern, or any combination thereof.

31. An apparatus for wireless communication at a second device of a wireless communications network, comprising:

one or more memories; and one or more processors coupled with the one or more memories and configured to cause the second device to:

transmit, to a first device of the wireless communications network, a configuration for a bandwidth part switching pattern for wireless communications performed at the first device, the bandwidth part switching pattern comprising at least a first bandwidth part and a second bandwidth part different from the first bandwidth part;

receive a first transmission from the first device during a first time interval and in accordance with the first bandwidth part and based at least in part on the bandwidth part switching pattern;

receive an indication of a bandwidth part switching procedure from the first bandwidth part to the second bandwidth part; and receive a second transmission from the first device during a second time interval different from the first time interval in accordance with the second bandwidth part and based at least in part on the indication of the bandwidth part switching procedure.

32. The apparatus of claim 31, wherein the one or more processors are further configured to cause the second device to:

receive, from the second device, a physical downlink shared channel transmission that comprises the configuration for the bandwidth part switching pattern, wherein the first transmission, the second transmission, or both, are transmitted based at least in part on reception of the physical downlink shared channel transmission.

33. The apparatus of claim 32, wherein the one or more processors are further configured to cause the second device to:

receive, via the physical downlink shared channel transmission, a set of parameters associated with the bandwidth part switching pattern, wherein the first transmission, the second transmission, or both, are transmitted in accordance with the set of parameters.

34. The apparatus of claim 33, the set of parameters comprising at least one of periodicity of the bandwidth part switching pattern, a sequence of bandwidth parts within the bandwidth part switching pattern, an indication of a starting time for the bandwidth part switching pattern, a set of time intervals associated with a set of bandwidth parts of the bandwidth part switching pattern, or any combination thereof.

35. A non-transitory computer-readable medium storing code for wireless communications at a first device of a wireless communications network, the code comprising instructions executable by one or more processors to cause the first device to:

receive, from a second device of the wireless communications network, a configuration for a bandwidth part switching pattern for wireless communications performed at the first device, the bandwidth part switching pattern comprising at least a first bandwidth part and a second bandwidth part different from the first bandwidth part;

transmit, to a third device, an indication of the first bandwidth part of the bandwidth part switching pattern;

transmit a first transmission to one or more devices including the third device during a first time interval in accordance with the first bandwidth part and based at least in part on the bandwidth part switching pattern;

transmit, to the third device, an indication of a bandwidth part switching procedure from the first bandwidth part to the second bandwidth part; and transmit a second transmission to the one or more devices including the third device during a second time interval different from the first time interval in accordance with the second bandwidth part and based at least in part on the indication of the bandwidth part switching procedure.

36. A non-transitory computer-readable medium storing code for wireless communications at a second device of a wireless communications network, the code comprising instructions executable by one or more processors to cause the second device to:

transmit, to a first device of the wireless communications network, a configuration for a bandwidth part switching pattern for wireless communications performed at the first device, the bandwidth part switching pattern comprising at least a first bandwidth part and a second bandwidth part different from the first bandwidth part;

receive a first transmission from the first device during a first time interval and in accordance with the first bandwidth part and based at least in part on the bandwidth part switching pattern;

receive an indication of a bandwidth part switching procedure from the first bandwidth part to the second bandwidth part; and receive a second transmission from the first device during a second time interval different from the first time interval in accordance with the second bandwidth part and based at least in part on the indication of the bandwidth part switching procedure.

* * * * *